US010668406B2

(12) United States Patent
Dlugasch et al.

(10) Patent No.: US 10,668,406 B2
(45) Date of Patent: Jun. 2, 2020

(54) MULTI-DIMENSIONAL CHROMATOGRAPHY SYSTEM USING AT-COLUMN DILUTION

(71) Applicant: Waters Technologies Corporation, Milford, MA (US)

(72) Inventors: Amanda B. Dlugasch, Ashland, MA (US); Thomas E. Wheat, Hopedale, MA (US); Dan Root, Uxbridge, MA (US); Jean-Michel Plankeele, Le Blanc-Mesnil (FR); Isabelle Francois, Sint-Lievens-Houtem (BE); Edward R. Aig, Fair Lawn, NJ (US)

(73) Assignee: Waters Technologies Corporation, Milford, MA (US)

( * ) Notice: Subject to any disclaimer, the term of this patent is extended or adjusted under 35 U.S.C. 154(b) by 449 days.

(21) Appl. No.: 15/410,958

(22) Filed: Jan. 20, 2017

(65) Prior Publication Data
US 2017/0209812 A1    Jul. 27, 2017

Related U.S. Application Data

(60) Provisional application No. 62/286,187, filed on Jan. 22, 2016, provisional application No. 62/286,603, filed on Jan. 25, 2016.

(51) Int. Cl.
*B01D 15/18* (2006.01)
*B01D 15/24* (2006.01)
(Continued)

(52) U.S. Cl.
CPC ....... *B01D 15/245* (2013.01); *B01D 15/1878* (2013.01); *B01D 15/247* (2013.01);
(Continued)

(58) Field of Classification Search
None
See application file for complete search history.

(56) References Cited

U.S. PATENT DOCUMENTS 5,117,109 A * 5/1992 Asakawa ............. G01N 30/728
210/198.2
6,790,361 B2   9/2004 Wheat et al.
(Continued)

FOREIGN PATENT DOCUMENTS

EP    3213065 A1    9/2017
WO    2008150763 A1   12/2008

OTHER PUBLICATIONS

Proteomics Liquid Chromatography (LC) Separations. ThermoFisher Scientific, United States. https://www.thermofisher.com/us/en/home/industrial/mass-spectrometry/proteomics-protein-mass-spectrometry/proteomics-mass-spectrometry/proteomics-liquid-chromatography-lc-separations.html Last accessed Apr. 10, 2018.
(Continued)

*Primary Examiner* — Bradley R Spies
(74) *Attorney, Agent, or Firm* — Womble Bond Dickinson (US) LLP; Deborah M. Vernon; Benedict L. Hanrahan

(57) ABSTRACT

The present disclosure relates to an enhanced multi-dimensional chromatography system and method using selectable At-Column Dilution to improve compatibility of the interface and transfer between the multiple dimensions. The use of At-Column Dilution ("ACD") with multi-dimensional chromatography can provide greater retention of the diverted components on subsequent stationary phases, and increase the sensitivity and peak shape of the component(s) separated on subsequent dimensions.

12 Claims, 23 Drawing Sheets

(51) Int. Cl.
  *G01N 30/78* (2006.01)
  *G01N 30/16* (2006.01)
  *G01N 30/34* (2006.01)

(52) U.S. Cl.
  CPC ............. *G01N 30/16* (2013.01); *G01N 30/34* (2013.01); *G01N 30/78* (2013.01); *G01N 2030/347* (2013.01)

(56) References Cited

U.S. PATENT DOCUMENTS

| | | |
|---|---|---|
| 7,875,175 B2 | 1/2011 | Wheat et al. |
| 7,909,994 B2 | 3/2011 | Wheat et al. |
| 8,642,351 B2 | 2/2014 | Liu et al. |
| 2003/0168392 A1 | 9/2003 | Masuda et al. |
| 2004/0173509 A1 | 9/2004 | Ito et al. |
| 2005/0167348 A1* | 8/2005 | Iwata ............... G01N 30/08 210/198.2 |
| 2006/0156792 A1 | 7/2006 | Wang |
| 2006/0219638 A1 | 10/2006 | Watanabe et al. |
| 2007/0023639 A1 | 2/2007 | Yamashita et al. |
| 2007/0199874 A1 | 8/2007 | Ito et al. |
| 2010/0107742 A1* | 5/2010 | Liu ............... G01N 30/34 73/61.56 |
| 2011/0167898 A1 | 7/2011 | Zhou et al. |
| 2016/0161454 A1* | 6/2016 | Jones ............... B01D 15/245 73/61.52 |

OTHER PUBLICATIONS

InfinityLab 2D-LC Solutions, 1290 Infinity II 2D-LC System. Agilent Technologies, United States. https://www.agilent.com/en/products/liquid-chromatography/infinitylab-lc-workflow-solutions/infinitylab-2d-lc-solutions/1290-infinity-ii-2d-lc-system#literature Last accessed, Apr. 10, 2018.

Trap-Free 2D LC/MS system for Quadrupole LCMS. Shimadzu Corporation. https://www.shimadzu.com/an/lcms/trap-free/qp.html. Last accessed Apr. 10, 2018.

Trap-Free 2D LC/MS Impurity Identification System. Shimadzu Corporation. https://www.shimadzu.com/an/lcms/trap-free/index.html. Last accessed Apr. 10, 2018.

* cited by examiner

Figure 5

| Dimension 1-QSM | | | | Dimension 2-BSM | | | | ISM | | Valves | | |
| --- | --- | --- | --- | --- | --- | --- | --- | --- | --- | --- | --- | --- |
| Time | Flow | %A | %B | Time | Flow | %A | %B | Time | Flow | Time | VL | VR |
| 0.0 | 0.6 | 95 | 5 | 0.0 | 0.6 | 100 | 0 | 0.0 | 1.5 | 0 | 2 | 2 |
| - | - | - | - | - | - | - | - | - | - | 1.10 | 2 | 1 |
| - | - | - | - | - | - | - | - | - | - | 1.20 | 2 | 2 |
| - | - | - | - | 1.5 | 0.6 | 100 | 0 | 1.5 | 0.0 | 1.50 | 1 | 2 |
| 3.0 | 0.6 | 5 | 95 | - | - | - | - | - | - | - | - | - |
| 4.0 | 0.6 | 95 | 5 | 4.5 | 0.6 | 5 | 95 | - | - | - | - | - |
| - | - | - | - | 6.0 | 0.6 | 100 | 0 | - | - | - | - | - |
| - | - | - | - | 9.0 | 0.05 | 100 | 0 | - | - | - | - | - |
| 25.0 | 0.05 | 95 | 5 | - | - | - | - | 9.0 | 1.5 | 9.0 | 2 | 2 |

Figure 11

| Method Details |||||||||||||
|---|---|---|---|---|---|---|---|---|---|---|---|---|
| Dimension 1-QSM |||| Dimension 2-BSM |||| ISM || Valves |||
| Time | Flow | %A | %B | %C | Time | Flow | %A | %B | Time | Flow | Time | VL | VR |
| 0.0 | 0.6 | 85.0 | 5.0 | 10.0 | 0.0 | 0.6 | 95.0 | 5.0 | 0.0 | 1.50 | 0.0 | 2 | 2 |
| 3.0 | 0.6 | 10.0 | 85.0 | 10.0 | 2.45 | 0.6 | 95.0 | 5.0 | 2.10 | 0.25 | 1.68 | 2 | 1 |
| 4.0 | 0.6 | 85.0 | 5.0 | 10.0 | 5.45 | 0.6 | 20.0 | 80.0 | 2.20 | 0.25 | 1.95 | 2 | 2 |
| 25.0 | 0.0 | 85.0 | 5.0 | 10.0 | 6.45 | 0.6 | 95.0 | 5.0 | 25.0 | 0.0 | 2.45 | 1 | 2 |
|  |  |  |  |  | 25.0 | 0.0 | 95.0 | 5.0 |  |  | 9.00 | 2 | 2 |

MULTI-DIMENSIONAL CHROMATOGRAPHY SYSTEM USING AT-COLUMN DILUTION

CROSS-REFERENCE TO RELATED APPLICATIONS

This application claims priority to U.S. Provisional Application No. 62/286,187, filed Jan. 22, 2016 and U.S. Provisional Application No. 62/286,603, filed Jan. 25, 2016, the contents of each are incorporated herein by reference in its entirety.

TECHNICAL FIELD

The present disclosure relates generally to a chromatography system and method for performing multi-dimensional chromatography. In particular, the present disclosure relates to the use of selectable At-Column Dilution (ACD) to enhance multi-dimensional chromatography.

BACKGROUND OF THE INVENTION

Chromatography involves the separation of a mixture of components by passing the components, contained within a mobile phase, through a stationary phase having different affinities for each component. The separated components can be identified and/or quantified using a variety of detectors. A typical chromatography system includes a single column, or dimension, containing the stationary phase. One of the fundamental limits of traditional chromatographic techniques is the limited number of components that can be resolved in a single analysis.

This limitation can be addressed using multi-dimensional chromatography. For example, in two-dimensional chromatography a particular group of components is transferred to a second separation column. The group of components is typically one that is not well separated on the first dimension and may co-elute in a single peak or band. The group of components, however, can be better separated on the second separation column. The second separation column typically has an orthogonal mode of separation as compared to the first separation column.

To derive the full benefit of the second chromatography column, and of multi-dimensional chromatography, the interface and transfer between the two dimensions should be compatible. With many multi-dimensional chromatography techniques, and especially those involving orthogonal modes of separation, the interface and transfer are not compatible. The mobile phases used for the orthogonal chromatography modes are mainly responsible for the incompatibility.

The present disclosure relates to an enhanced multi-dimensional chromatography system and method using selectable At-Column Dilution to improve compatibility of the interface and transfer between multiple dimensions.

SUMMARY OF THE INVENTION

The present disclosure relates generally to a chromatography system and method for performing multi-dimensional chromatography.

In one embodiment, the present disclosure relates to a chromatography system including (i) a first fluid pump for pumping a first flow stream, (ii) a first chromatography column downstream of the first pump, (iii) a first valve downstream of the first chromatography column, wherein the first valve is configured to divert the first flow stream to a first detector or to a mixer, (iv) a second fluid pump for pumping a second flow stream in fluid communication with the mixer, wherein the first and second flow streams have at least one physical or chemical difference and combine to form a third flow stream, wherein the pumps (or pump controllers) can vary the ratio of first to second flow streams forming the third flow stream from 0:1 to 1:0, (v) a second valve downstream of the mixer; wherein the second valve is configured to divert the third flow stream to a trap, loop or waste, the trap or loop having a front end and a back end and the third flow stream is in fluid communication with the front end of the trap or loop, and wherein the trap or loop is configured to physically or chemically retain an analyte in the third flow stream, (vi) a third fluid pump for pumping a fourth flow stream and in fluid communication with the second valve; wherein the second valve is configured to divert the fourth flow stream to a second chromatography column or to the back end of the trap or loop and then through the second chromatography column, and (vii) one or more detectors, e.g., a second detector, downstream of the second chromatography column.

In another embodiment, the present disclosure relates to a chromatography system including (i) a first fluid pump for pumping a first flow stream, (ii) a first chromatography column downstream of the first pump, (iii) a first valve downstream of the first chromatography column, wherein the first valve is configured to divert the first flow stream to a first detector or to a second valve; wherein the second valve is configured to divert the first flow stream to an mixer or to waste, (iv) a second fluid pump for pumping a second flow stream in fluid communication with the mixer, wherein the first and second flow streams have at least one physical or chemical difference and combine to form a third flow stream, wherein the pumps or pump controllers can vary the ratio of first to second flow streams forming the third flow stream from 0:1 to 1:0, (v) a trap or loop downstream of the mixer, the trap or loop having a front end and a back end, wherein the third flow stream is in fluid communication with the front end of the trap or loop and wherein the trap or loop is configured to physically or chemically retain an analyte in the third flow stream, (vi) a third fluid pump for pumping a fourth flow stream and in fluid communication with the second valve; wherein the second valve is configured to divert the fourth flow stream to (a) a second chromatography column or (b) the back end of the trap or loop, then to the mixer wherein the fourth and a fifth flow stream having at least one physical or chemical difference combine to form a sixth flow stream, wherein the second and third pumps can vary the ratio of fourth to fifth flow streams forming the sixth flow stream from 0:1 to 1:0, and through the second chromatography column, and (vii) one or more detectors, e.g., a second detector, downstream of the second chromatography column.

In another embodiment, the present disclosure relates to a chromatography method including (i) injecting a sample into a first flow stream, (ii) separating the sample into two or more components on a first chromatography column, (iii) diverting a portion of the two or more components from the first flow stream, (iv) diluting the diverted portion of the first flow stream with a second flow stream to form a third flow stream, (v) isolating the diverted portion of the two or more components on a trap, (vi) passing a fourth flow stream through the trap to elute the diverted portion of the two or more components, and (vii) separating the diverted portion of the two or more component on a second chromatography column. The diluting of the first flow stream by the second flow stream can increase the retention of the diverted portion of the two or more components on the trap.

In another embodiment, the present disclosure relates to a chromatography method, including (i) injecting a sample into a first flow stream, (ii) separating the sample into two or more components on a first chromatography column, (iii) diverting a portion of the two or more components from the first flow stream, (iv) diluting the diverted portion of the first flow stream with a second flow stream to form a third flow stream, (v) isolating the diverted portion of the two or more components on a trap, (vi) passing a fourth flow stream through the trap to elute the diverted portion of the two or more components, (vii) diluting the fourth flow stream with the fifth flow stream to form a sixth flow stream, and (viii) separating the diverted portion of the two or more component on a second chromatography column. The diluting of the first flow stream by the second flow stream can increase the retention of the diverted portion of the two or more components on the trap. The diluting of the fourth flow stream by the fifth flow stream can increase the retention of the diverted portion of the two or more components on the second chromatography column.

The system and method of the present disclosure provides several advantages over the prior art. The use of At-Column Dilution with multi-dimensional chromatography can provide greater retention of the diverted components on subsequent stationary phases, and increase the sensitivity and peak shape of the component(s) separated on subsequent dimensions. It can also enhance the loading capacity of one or more columns within the multi-dimensional chromatography system to allow for the purification and isolation of a larger quantity of components per separation. The composition of the solution, e.g., mobile phase, that delivers the sample to the trap or to the second column can be modified or changed to provide for the sample moving from one mode of chromatography to another previously incompatible mode. Further, increased information and sample characterization can also be obtained, such as when a non-volatile mobile phase is converted to one compatible with acquiring mass spectrometry information. Similarly, robustness can be improved by minimizing co-elution of a matrix and analyte that provides inconsistent mass spectrometry ionization.

BRIEF DESCRIPTION OF THE DRAWINGS

The foregoing and other advantages provided by the present disclosure will be more fully understood from the following description of exemplary embodiments when read together with the accompanying drawings, in which:

FIG. 5 shows an exemplary example of method details and fluid flows for a multi-dimensional system with At-Column Dilution for one dimension.

FIG. 11 shows an exemplary table listing the method details and fluid flows within a multi-dimensional system with At-Column Dilution for both dimensions.

DETAILED DESCRIPTION

Figure 1:
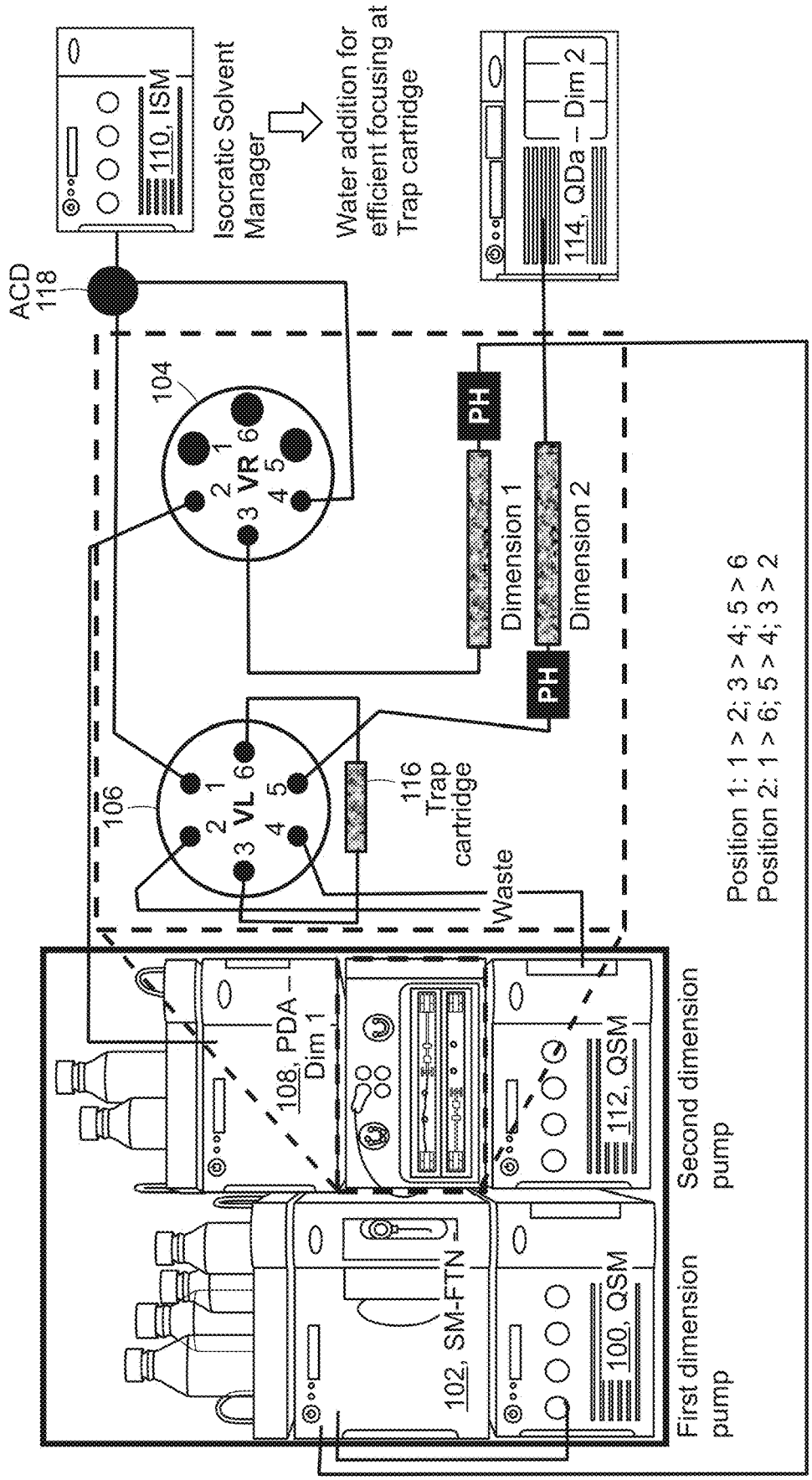
FIG. 1 shows an exemplary flow diagram of a multi-dimensional system with At-Column Dilution for one dimension.

The present disclosure relates to an enhanced multi-dimensional chromatography system and method using selectable At-Column Dilution to improve compatibility of the interface and transfer between the multiple dimensions.

In one embodiment, the present disclosure relates to a chromatography system including a first fluid pump for pumping a first flow stream, a first chromatography column downstream of the first pump, a first valve downstream of the first chromatography column, wherein the first valve is configured to divert the first flow stream to a first detector or to a mixer, a second fluid pump for pumping a second flow stream in fluid communication with the mixer, wherein the first and second flow streams have at least one physical or chemical difference and combine to form a third flow stream, wherein the mixer can vary the ratio of first to second flow streams forming the third flow stream from 0:1 to 1:0, a second valve downstream of the mixer; wherein the second valve is configured to divert the third flow stream to a trap (or loop) or to waste, the trap having a front end and a back end and the third flow stream is in fluid communication with the front end of the trap, and wherein the trap is configured to physically or chemically retain an analyte in the third flow stream, a third fluid pump for pumping a fourth flow stream and in fluid communication with the second valve; wherein the second valve is configured to divert the fourth flow stream to a second chromatography column or to the back end of the trap and then through the second chromatography column, and one or more detectors downstream of the second chromatography column.

The chromatography system can include any type of chromatography technique that can be configured into a multi-dimensional chromatography system. The chromatography system can include normal phase chromatography, reversed phase chromatography, carbon dioxide based chromatography, size exclusion chromatography, ion exchange chromatography, hydrophilic interaction liquid interaction chromatography, hydrophobic interaction chromatography, affinity chromatography, and combinations thereof. The chromatography system can also include the following combinations of techniques, such as, reversed phase-reversed phase chromatography, normal phase-reversed phase chromatography, reversed phase-carbon dioxide based chromatography, normal phase-carbon dioxide based chromatography, ion exchange-reversed phase chromatography, ion exchange-size exclusion chromatography, affinity chromatography-ion exchange, affinity chromatography-size exclusion, affinity chromatography-reversed phase chromatography. These combination techniques can be combined in any order.

The chromatography system can include one or more fluid pumps, e.g., a first fluid pump, a second fluid pump, a third fluid pump, etc. Each pump can be any pump capable for generating a fluid flow (e.g., flow stream) through the multi-dimensional chromatography system. Each fluid flow can independently have a flow rate of about 0.01 uL/min, 0.1 uL/min, 1 uL/min, 0.01 mL/min, 0.1 ml/min, 1 mL/min, 10 ml/min, 100 mL/min or about 300 ml/min, depending on the chromatography techniques involved, the diameter of the tubing, valve orifices, column diameters, detector cells etc. These values can also be used to define a range, such as about 0.01 to about 10 mL/min, or about 0.1 to about 2 mL/min.

Each fluid flow can independently contain various amount of organic, aqueous and compressible fluid (e.g., carbon dioxide) content. A fluid flow can contain about 0, 5, 10, 15, 20, 25, 30, 35, 40, 45, 50, 55, 60, 65, 70, 75, 80, 85, 90, 95 or about 100% organic content. These values can be used to define a range, such as about 70% to about 90%. A fluid flow can also contain about 0, 5, 10, 15, 20, 25, 30, 35, 40, 45, 50, 55, 60, 65, 70, 75, 80, 85, 90, 95 or about 100% aqueous content. These values can be used to define a range, such as about 20% to about 40%. A fluid flow can contain about 0, 5, 10, 15, 20, 25, 30, 35, 40, 45, 50, 55, 60, 65, 70, 75, 80, 85, 90, 95 or about 100% compressible fluid (e.g., carbon dioxide) content. In one embodiment, a fluid flow containing carbon dioxide, e.g., a carbon dioxide based chromatography technique, can contain a co-solvent or modifier. The amount of co-solvent or modifier in the carbon dioxide mobile phase can vary depending on whether it is organic or aqueous, as provided above. The co-solvent or modifier can be methanol. In one embodiment, one of the fluid flows can be 95% carbon dioxide containing 5% methanol.

Each fluid flow can independently have various pH values. A fluid flow can have a pH value of about 2, 2.5, 3, 3.5, 4, 4.5, 5, 5.5, 6, 6.5, 7, 7.5, 8, 8.5, 9, 9.5, 10, 10.5, 11, 11.5, 12, 12.5 and about 13. These values can be used to define a range, such as about 6 to about 8, or about 3 to about 5.

Each fluid flow can independently contain various ionic strength values of about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4 or about 5 M. These values can be used to define a range, such as about 0.01 to about 0.5 M.

One or more of the fluid flows in the system or method of the present disclosure can be a strong mobile phase with respect to one of the chromatography techniques. A strong mobile phase is one that has a high elution strength and results in little or no retention of a component on a chromatography column, or sorbent. A sample or component dissolved in a strong mobile phase will have a greater affinity for the mobile phase than the stationary phase.

One or more of the fluid flows can be a weak mobile phase with respect to one of the chromatography techniques. A weak mobile phase is one that has a low elution strength and results in high retention of a component on a chromatography column, or sorbent. A sample or component dissolved in a weak mobile phase will have a lesser affinity for the mobile phase than the stationary phase.

The chromatography system can include one or more chromatography columns, e.g., a first chromatography column, a second chromatography column, etc. The columns can be any column used to separate one or more analytes using one or more of the chromatography techniques in a multi-dimensional chromatography system. The columns can include preparative columns, analytical columns and capillary columns.

The chromatography system can include one or more valves, e.g., a first valve, a second valve, etc. The valve can be any valve used with one or more of the chromatography techniques and capable for, or configured to divert at least one flow to at least two different flow paths. The valves can have multiple ports and conduits, and be capable of, or configured to divert at least two flows to at least two different flow paths wherein each can be diverted simultaneously. The valves can also be capable of, or configured to divert at least three flows to at least two different flow paths wherein each can be diverted simultaneously (e.g., a 4 port valve, a 6 port valve, a 8 port valve, a 10 port valve).

The chromatography system can include one or more detectors, e.g., a first detector, a second detector, etc. The detector can be any detector used with one or more of the chromatography techniques. The detector can be a UV detector, a photo diode array detector, a mass spectrometer, a NMR detector, a fluorescence detector, an evaporative light scattering detector, a charges aerosol detector, a conductivity detector, an electrochemical detector or combinations thereof. In some embodiments, the present disclosure can incorporate traditionally non-compatible detectors to the analysis of a sample by use of selectable At-Column Dilution, such as by eliminating ion pairing reagents or adjusting pH for best or consistent detection. The chromatography system and method of the present disclosure can be used to transfer and interface with other analytical techniques, such as a fraction collector.

Some current chromatographic methods are not suitable for mass detection. These methods can be performed using the multi-dimensional system of the present disclosure which can modify the method conditions to be compatible with a mass detector. For example, the current method can be run on a first dimension in which a target peak is transferred to a second dimension. In the second dimension, the isolated peak can be trapped on a reversed-phase cartridge. After washing away the unretained salt and buffer, the isolated peak can be washed onto a second reversed-phase column using a volatile mobile phase, e.g., water-acetonitrile-formic acid. A gradient of these solvents can be used to elute from the second reversed-phase column into the source of the mass spectrometer. In the second dimension, the method conditions can be changed in order to separate the target peak into individual components and at the same time obtaining conditions that are suitable for mass detection of the component(s) within the peak. Alternatively, the change in the second dimension can be a change in column chemistry, mobile phase, or combinations thereof.

The chromatography system can include at least one At-Column Dilution mixer (e.g., ACD "T") capable of, or configured to mix at least two fluid flows together to form a combined fluid flow. The injector can be a fitting as described in U.S. Pat. Nos. 6,790,361; 7,875,175 and 7,909, 994, the contents of each are incorporated herein by reference in their entirety. The mixer can be a standard liquid chromatography tee, Y, inverted Y, or inverted Y union. The mixer can also be a small packed-bed mixer such as those used for solvent blending (e.g., P/N 700002911 commercially available from Waters Corporation, Milford, Mass., USA). At-Column Dilution can permit the injection of large volumes of strong solvents, can improve both mass capacity and resolution, and can extend column life.

The At-Column Dilution mixer can combine at least two flow streams, e.g., the first and second flow streams, having at least one physical or chemical difference between them to form a combined flow stream, e.g. a third flow stream. The mixer can combine the flow streams in any ratio from 0:1 to 1:0 to obtain a combined flow stream. The at least two flow streams can have a physical or chemical difference between them including the ratio of organic/aqueous or carbon dioxide/organic/aqueous content, pH values, ionic strength values, or combinations thereof. The combined flow stream can be isocratic or can be a gradient with respect to one or more characteristics.

The system and method of the present disclosure can improve the interface and transfer between at least two dimensions in a multi-dimension chromatography system by controlling or selectively combining at least two fluid flows to form a combined flow having certain chemical or physical properties. In one embodiment, the two fluid flows (e.g., a first and a second fluid stream) can be combined into a combined flow (e.g., a third fluid stream) wherein the combined flow stream has about 80%, 75, 70, 65, 60, 55, 50, 45, 40, 35, 30, 25, 20, 15, 10 or about 5%, or less (or more), by volume, of organic content or composition than one of the first flow streams. These values can also be used to define ranges, such as about 50% to about 20%. In particular, the two fluid flows can be combined into a combined flow wherein the combined flow has about 50% or less, by volume, of organic content or composition than the first flow stream. In some embodiments, the combined flow can have more, by volume, organic content.

In another embodiment, the two fluid streams can be combined into a combined fluid stream wherein the combined flow stream has a pH value about or at least about, 0.5, 1, 1.5, 2, 2.5 or about 3 pH units different (e.g., less or greater) than one of the first flow streams. In particular, the two fluid flows can be combined into a combined flow wherein the combined flow has a pH value about or at least about 1 pH unit different than the first flow stream.

In another embodiment, the two fluid streams can be combined into a combined fluid stream wherein the combined flow stream has about 80%, 75, 70, 65, 60, 55, 50, 45, 40, 35, 30, 25, 20, 15, 10 or about 5%, or less (or more) ionic strength than one of the first flow streams. These values can also be used to define ranges, such as about 60% to about 30%. In particular, the two fluid flows can be combined into a combined flow wherein the combined flow has about 50% or less ionic strength than the first flow stream. In some embodiments, the combined flow can have more or a higher ionic strength.

The system can include a trap or other component (e.g., loop, a chromatography column, cartridge) to isolate one or more of the components diverted from a first separation dimension. The trap can have a high affinity for one or more of the components diverted from a first separation dimension. In one embodiment, the trap is configured to physically or chemically retain an analyte in the third flow stream. The trap can have a front end and a back end, wherein both ends can be connected to at least one fluid pump for pumping a fluid flow through the trap from front-to-back, or back-to-front. The trap can be a trap column or cartridge containing a chromatographic media used for reversed phase, normal phase, affinity chromatography-ion exchange, affinity chromatography-size exclusion, affinity chromatography-reversed-phase, or combinations thereof.

The system and method of the present disclosure can increase the retention of at least one diverted component (or analyte) on the trap (or other device) or additional chromatography column, e.g., the second chromatography column. The retention of the at least one the diverted component can be increased by about 5%, 10, 15, 20, 25, 30, 35, 40, 45, 50, 55, 60, 65, 70, 75, 80, 85, 90, 95 or about 100% as compared to a system or method without At-Column Dilution as described herein. These values can be used to define a range, such as about 50% to about 90%.

In another embodiment, the present disclosure relates to a chromatography system including a first fluid pump for pumping a first flow stream, a first chromatography column downstream of the first pump, a first valve downstream of the first chromatography column, wherein the first valve is configured to divert the first flow stream to a first detector or to a second valve; wherein the second valve is configured to divert the first flow stream to a mixer or to waste, a second fluid pump for pumping a second flow stream in fluid communication with the mixer, wherein the first and second flow streams have at least one physical or chemical difference and combine to form a third flow stream, wherein the first and second pumps can vary the ratio of first to second flow streams forming the third flow stream from 0:1 to 1:0, a trap downstream of the mixer, the trap having a front end and a back end, wherein the third flow stream is in fluid communication with the front end of the trap and wherein the trap is configured to physically or chemically retain an analyte in the third flow stream, a third fluid pump for pumping a fourth flow stream and in fluid communication with the second valve; wherein the second valve is configured to divert the fourth flow stream to a second chromatography column or the back end of the trap or loop, then to the mixer wherein the fourth and a fifth flow stream have at least one physical or chemical difference combine to form a sixth flow stream, wherein the second and third pumps can vary the ratio of fourth to fifth flow streams forming the sixth flow stream from 0:1 to 1:0, and through the second chromatography column, and one or more detectors downstream of the second chromatography column.

In some embodiments, the fourth flow stream can be a strong mobile phase and the fifth flow stream can be a weak mobile phase.

The system and method of the present disclosure can improve the interface and transfer between at least two dimensions in a multi-dimension chromatography system by controlling or selectively combining at least three (e.g., the second and fifth flows can be the same) or at least four fluid flows to form at least two combined flows having certain chemical or physical properties. In one embodiment, two fluid flows (e.g., a first and a second fluid stream) can be combined into a combined flow (e.g., a third fluid stream) and two additional fluid flows (e.g., a fourth and a fifth fluid flow) can be combined into a combined flow (e.g., a sixth fluid flow) wherein the third or sixth flow streams have about 80%, 75, 70, 65, 60, 55, 50, 45, 40, 35, 30, 25, 20, 15, 10 or about 5%, or less, by volume, of organic content or composition than one of the first or fourth flow streams, respectively. In some embodiments, the second and the fifth flow streams can have the same organic/aqueous/carbon dioxide/modifier composition, pH, ionic strength, or combinations thereof.

In another embodiment, two fluid flows (e.g., a first and a second fluid stream) can be combined into a combined flow (e.g., a third fluid stream) and two additional fluid flows (e.g., a fourth and a fifth fluid flow) can be combined into a combined flow (e.g., a sixth fluid flow) wherein the third and the sixth flow streams have a pH value about, at least about, 0.5, 1, 1.5, 2, 2.5 or about 3 pH units different than the first or fourth fluid stream, respectively.

In another embodiment, two fluid flows (e.g., a first and a second fluid stream) can be combined into a combined flow (e.g., a third fluid stream) and two additional fluid flows (e.g., a fourth and a fifth fluid flow) can be combined into a combined flow (e.g., a sixth fluid flow) wherein the third or sixth flow streams have about 80%, 75, 70, 65, 60, 55, 50, 45, 40, 35, 30, 25, 20, 15, 10 or about 5%, or less ionic strength than the first or fourth fluid stream, respectively.

In some embodiments, the arrangement of the chromatography techniques can require one or more of the combined streams to have physical or chemical characteristics less than the original flow stream(s), more than the original flow stream(s), or combinations thereof. A combined flow stream can have more or less organic/aqueous/carbon dioxide content, higher or lower pH value, more or less ionic stream. For example, the ionic strength can be increased for an arrangement of ion exchange—size exclusion chromatography.

In another embodiment, the present disclosure relates to a chromatography method, including injecting a sample into a first flow stream, separating the sample into two or more components on a first chromatography column, diverting a portion of the two or more components from the first flow stream, diluting the diverted portion of the first flow stream with a second flow stream to form a third flow stream, isolating the diverted portion of the two or more components on a trap or loop, passing a fourth flow stream through the trap to elute the diverted portion of the two or more components, and separating the diverted portion of the two or more component on a second chromatography column.

The sample can be introduced or injected into the first flow stream using standard injection techniques used in preparative, analytical and capillary chromatography. The first flow stream can be a strong mobile phase. The first (and or fourth) flow stream can be generated using a gradient wherein the first (and or fourth) flow stream is a weak mobile phase at the beginning of the separation and a strong, or stronger, mobile phase at the end of the separation or at the time when a portion of the first fluid flow is diverted to a second separation.

The sample can be separated into two or more components on the first chromatography column, e.g., first dimension, using standard separation conditions and methods used in preparative, analytical and capillary chromatography. The separation can be monitored using an on-line detection technique to identify one or more components that are not well resolved or that co-elute in a peak or band. These one or more components can be diverted from the separation based on the on-line analysis. An initial separation on the first chromatography column can also be performed to identify the retention times of any one or more components that are not well resolved or that co-elute in a peak or band. These one or more components can be diverted from subsequent separations based on the retention times.

At least one portion of the first fluid flow can be diverted to eventually be separated on a second chromatography column. The diverted portion can contain one or more components that are not well resolved or that co-elute in a peak or band. The diverted portion can be diluted with a second fluid flow to form a combined, or third fluid flow.

In some embodiments, the third flow stream can have 50% or less, by volume, of organic composition than the first flow stream. The third flow stream can have a pH value of at least 1 pH unit different than the first flow stream. And, the third flow stream can have 50% or less ionic strength than that of the first flow stream. In other embodiments, the diluting of the first flow stream by the second flow stream can increase the retention of the diverted portion of the two or more components on the trap.

The diverted portion of the two or more components can be isolated on a trap, or other similar device. The combined fluid flow can have at least one physical or chemical difference, as provided herein, that can increase the retention of any diverted analytes, compounds or components on the trap, or similar device, or subsequent stationary phases.

A fourth flow stream can be passed or flowed through the trap, or similar device, to elute the isolated or retained components. The fourth flow stream can be a strong mobile phase compared to the isolated or retained components. The eluted components can be separated on a second chromatography column.

For example, a sample can be separated using two dimensions that are selected to separate and resolve a peak or group of peaks. The mobile phases used for each separation technique or mode can be incompatible, e.g., wherein the modes of separation are orthogonal to each other. The system and method of the present disclosure can adjust one or more of the mobile phase compositions to improve the compatibility or reduce the incompatibility between the dimensions. In some embodiments, the diverted component(s), or isolated analyte(s), can be kept in solution or can be adsorbed onto or trapped by a solid support.

In some embodiments, the system and method of the present disclosure can resolve and identify all, or nearly all, components contained in a single sample. In another embodiment, the system and method can resolve and identify at least two or more components contained in a single sample as compared to a system or method not configured or arranged to improve the interface and transfer of two or more components between dimensions in a multi-dimensional chromatography system. The multi-dimensional system of the present disclosure can be configured to have At-Column Dilution for one dimension, two dimensions or more dimensions.

The separation performance on the second chromatography column can be improved by the system and method of the present disclosure. For example, the inclusion of the At-Column Dilution feature can increase the sensitivity, e.g., signal-to-noise ratio, of the one or more detectors downstream of the second chromatography column by about 10%, 20, 30, 40, 50, 60, 70, 80, 90 or about 95% or more compared to a system or method without At-Column Dilution as described herein. The inclusion of the At-Column Dilution feature can also improve peak shape of components separated on the second chromatography column by about 10%, 20, 30, 40, 50, 60, 70, 80, 90 or about 95% or more compared to a system or method without At-Column Dilution as described herein.

In another aspect, the present disclosure relates to a chromatography method, including injecting a sample into a first flow stream, separating the sample into two or more components on a first chromatography column, diverting a portion of the two or more components from the first flow stream, diluting the diverted portion of the first flow stream with a second flow stream to form a third flow stream, isolating the diverted portion of the two or more components on a trap, loop or similar device, passing a fourth flow stream through the trap to elute the diverted portion of the two or more components, diluting the fourth flow stream with the fifth flow stream to form a sixth flow stream and separating the diverted portion of the two or more component on a second chromatography column.

The fourth flow stream can be a strong mobile phase compared to the isolated or retained components. The fourth flow stream can be combined with a fifth flow stream that can be a weak mobile phase. The fourth and fifth flow streams can combine to form a sixth flow stream that has at least one physical or chemical difference, as provided herein, that can increase the retention of any diverted analytes, compounds or components on subsequent stationary phases, e.g., the second chromatography column. The sixth flow stream can be isocratic or a gradient changing from a weak mobile phase to a strong, or stronger, mobile phase.

In some embodiments, the sixth flow stream can have 50% or less, by volume, of organic composition than the fourth flow stream. The sixth flow stream can have a pH value of at least 1 pH unit different than the fourth flow stream. And, the sixth flow stream can have 50% or less ionic strength than that of the fourth flow stream. In other embodiments, the diluting of the fourth flow stream by the fifth flow stream can increase the retention of the diverted portion of the two or more components on the second chromatography column.

The system and method of the present disclosure can use different chromatographic techniques and multiple detectors to get a full, or nearly full, classification of each component in a sample. The additional dimensions improve the ability to resolve components that can be fully resolved in a single analysis on a single dimension system.

In other embodiments, the chromatography system and method of the present disclosure can be used to improved isolation in purification or for sample preparation.

The disclosures of all cited references including publications, patents, and patent applications are expressly incorporated herein by reference in their entirety.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

The present invention is further defined in the following Examples. It should be understood that these Examples, while indicating preferred embodiments of the invention, are given by way of illustration only.

EXAMPLES

Example 1

Figure 2:
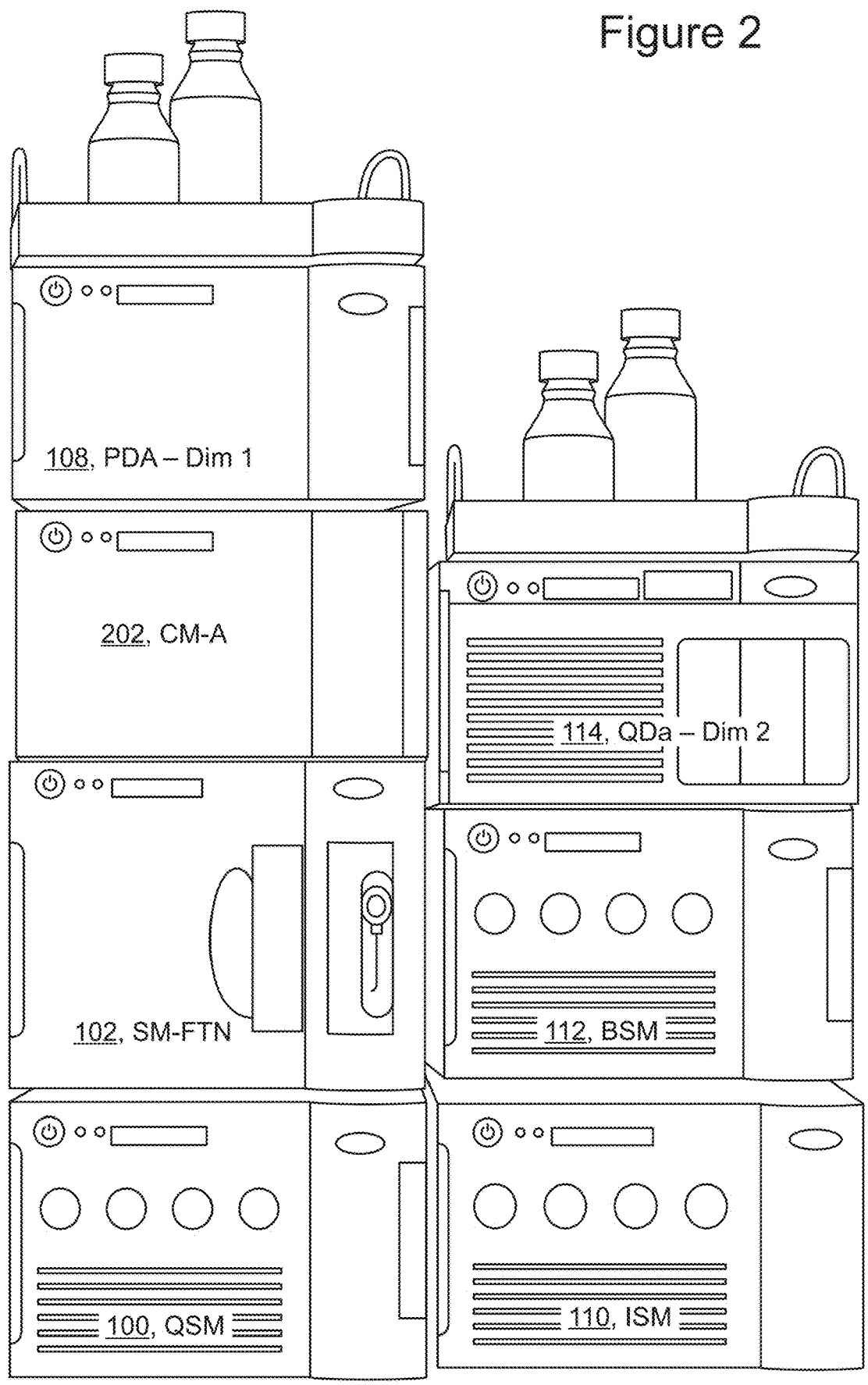
FIG. 2 shows an exemplary stacked configuration of a multi-dimensional system with At-Column Dilution for one or two dimensions.

A multi-dimensional chromatography system with At-Column Dilution for one dimension was prepared. The system (an example pictured in FIGS. 1 and 2) included a Quaternary Solvent Manager as the First dimension pump (QSM, 100), a Sample Manager (SM-FTN, 102), a Column Manager (CM-A, 202) having 2D valves with 6 ports/2 positions (VR, 104 and VL, 106), a Photo-Diode Array detector as the First dimension detector (PDA, 108), an Isocratic Solvent Manager as the Dilution pump (ISM, 110), a Binary Solvent Manager as the Second dimension pump (BSM, 112), a mass detector (e.g., an ACQUITY QDa® QDa, commercially available from Waters Corporation, Milford, Mass., USA) as the Second dimension detector (114) and a Trap cartridge (116). The system also included an At-Column Dilution (i.e, ACD) mixer (118). The system was run using Empower™ software on ACQUITY® DP4 SR1 instrumentation all commercially available from Waters Corporation, Milford, Mass., USA. On the right valve (VR), ports 1, 5 and 6 are closed with pin plugs. FIG. 1 shows an overview of the flow diagram and instrumentation. The chromatography system can be modified to include different detectors and other configurations of the modules in order to accommodate additional dimensions.

Figure 3:
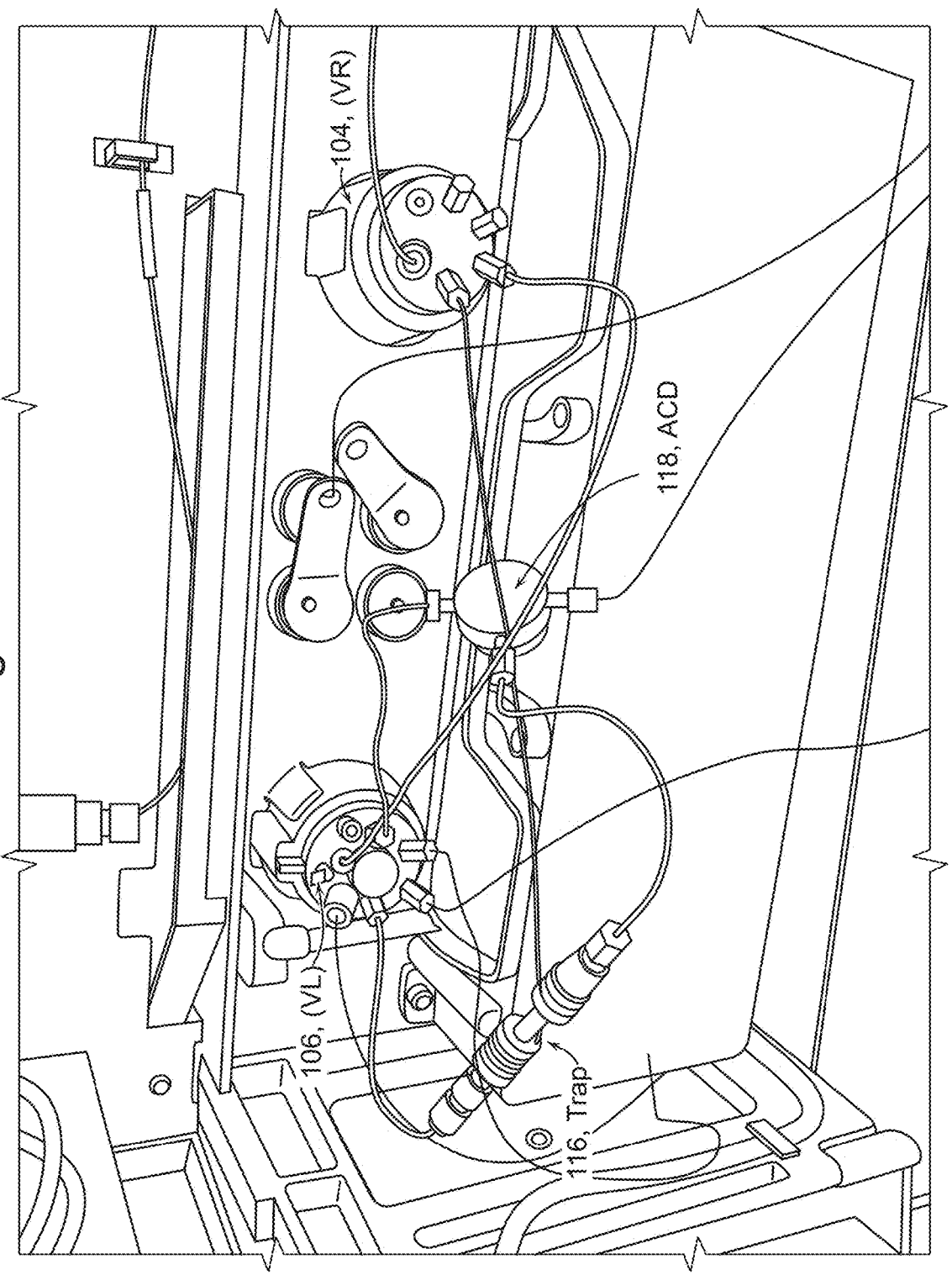
FIG. 3 shows a configuration of the multi-dimensional chromatography system with At-Column Dilution (two dimensions, duel At-Column Dilution) including a right value, left valve, trap and mixer.

The system was configured in a two stack system. The first stack (FIG. 2, left) included the following modules starting from the bottom to the top of the stack: the first pump (QSM, 100), the sample manage(SM-FTN, 102), the column manager (CM-A, 202), and the first detector(PDA, 108). Contained within the Column Manager (CM-A, 202) were the two 2D valves (VR, 104 and VL, 106). The second stack (FIG. 2, right) included the following modules starting from the bottom to the top: the dilution pump, also called the second pump (ISM, 110), the third pump (BSM, 112), and the second detector (QDa, 114). The configuration of the multi-dimensional system can place the At-Column Dilution (ACD) mixer or "T" in two locations. In the first location, the ACD "T" (118) was placed between the Right Valve (VR, 104) and the Left Valve (VL, 106) in which the second pump (ISM, 110) provided the dilution solvent. In this placement only the first dimension sample cut was diluted. FIG. 3 show a configuration of the multi-dimensional chromatography system with At-Column Dilution. The second configuration placed the ACD "T" (118) after the Left Valve (VL, 106) and before the trap cartridge (116). The configuration is described in Example 2. In that location both the first dimension and second dimensions were diluted.

Figure 4:
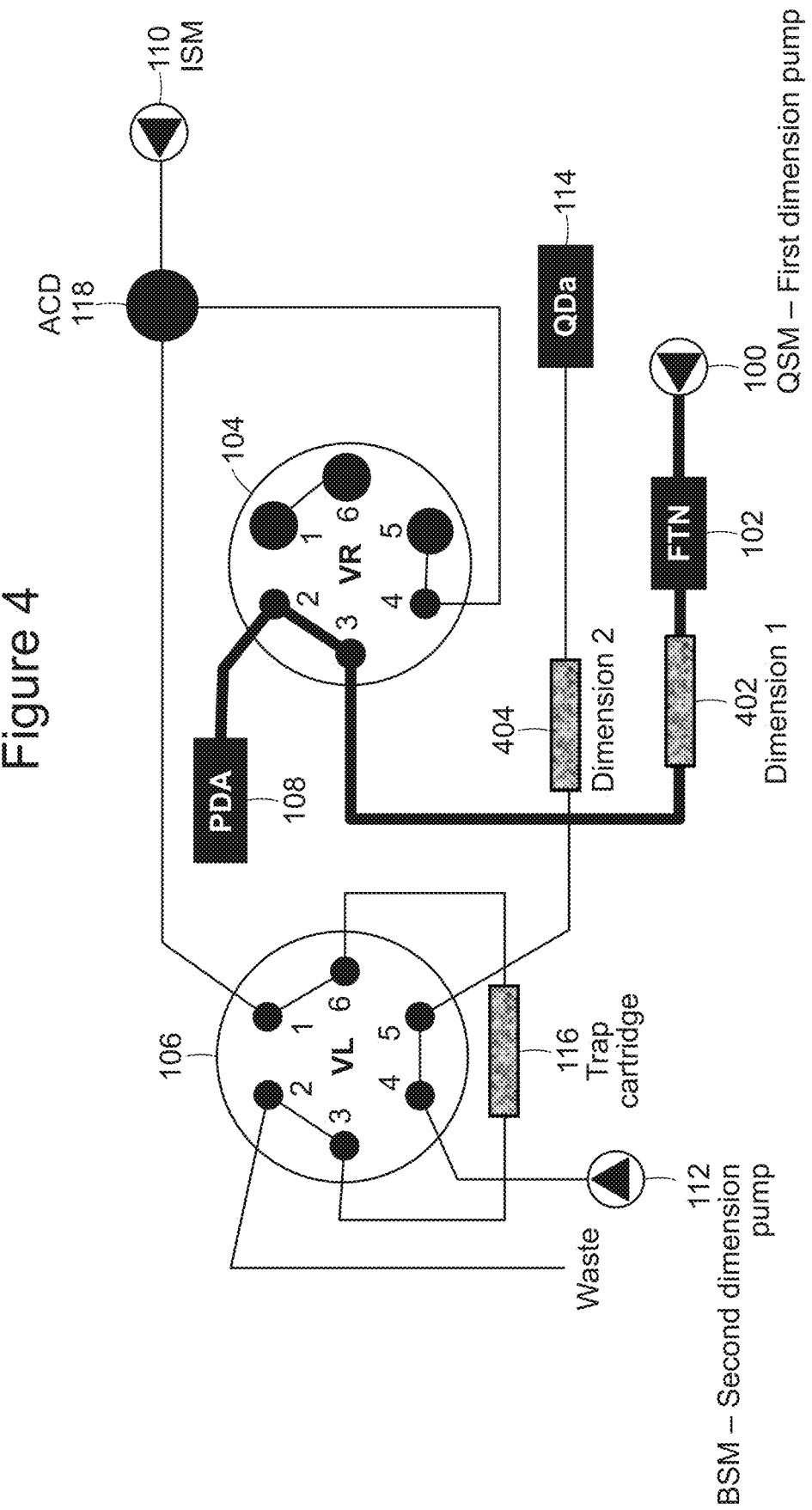
FIG. 4 shows the fluid flow for the first dimension flow for a multi-dimensional system with At-Column Dilution for one dimension. On the right valve, ports 1, 5 and 6 are closed with pin plugs.

A heart cutting exercise was performed to demonstrate the fluid flows and dilution. A first pump (QSM, 100) provided a first fluid flow to the first column (Dimension 1, 402), first valve (VR, 104) and first detector (PDA, 108). This initial configuration begins the 1D separation. The first valve (VR, 104) was positioned to allow the first flow to be directed to the first detector (Position 2) (PDA, 108). The second pump (ISM, 110) and second valve (VL, 106) were positioned (Position 2) to pre-treated the trap cartridge (116). The third pump (BSM, 112) equilibrated the second column (Dimension 2, 404). FIG. 4 shows the fluid flow for the first dimension flow. A summary of the method details and fluid flows is shown in FIG. 5. The method details include the time when the valves (VL and VR) change positions. A test cut of the first fluid flow was made from 1.1 to 1.2 minutes when the first valve (VR) position was changed to direct the first flow to the ACD and trap column. The first valve (VR, 104) is configured to switch in order to cut, or transfer, the peak from the first dimension. Initially, the first valve (VR, 104) was in Position 2; The second valve (VL, 106) was in Position 1.

Figure 6:
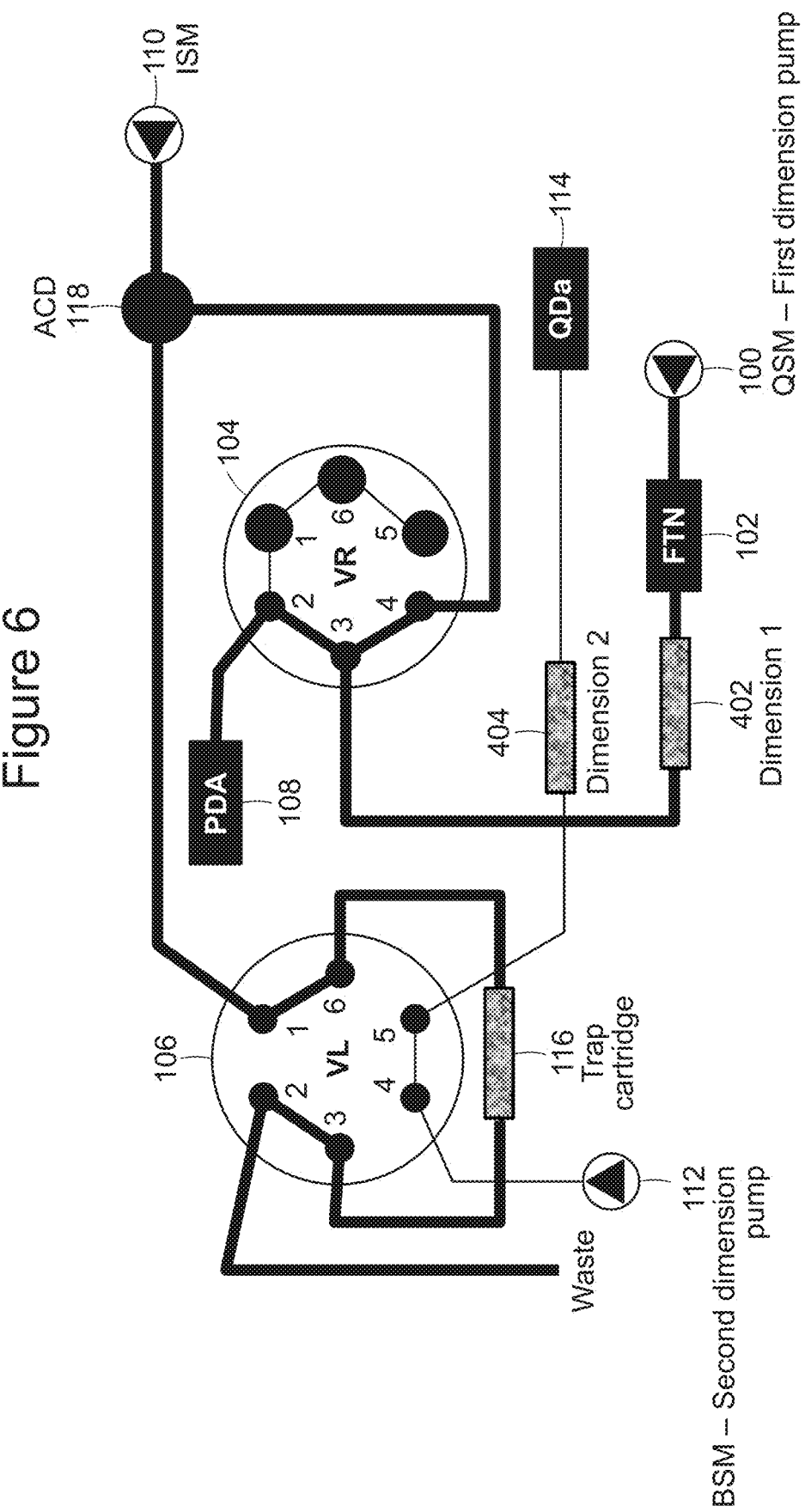
FIG. 6 shows an exemplary diversion of the first fluid flow from a first dimension separation on a multi-dimensional system with At-Column Dilution for one dimension.

FIG. 6 shows the configuration for the diversion of the first fluid flow for 1.1 and 1.2 minutes. The first fluid flow from the first pump (QSM, 100) was diluted by the second fluid flow from the second pump (ISM, 110) at the ACD (118). The flow path to the first detector (PDA, 108) was removed during the transfer. The first fluid flow was diluted from approximately 30% organic composition to a combined third fluid flow of about 8% organic content before being carried to the front end of the trap cartridge. The dilution can facilitate retention of the transferred analytes.

Figure 7:
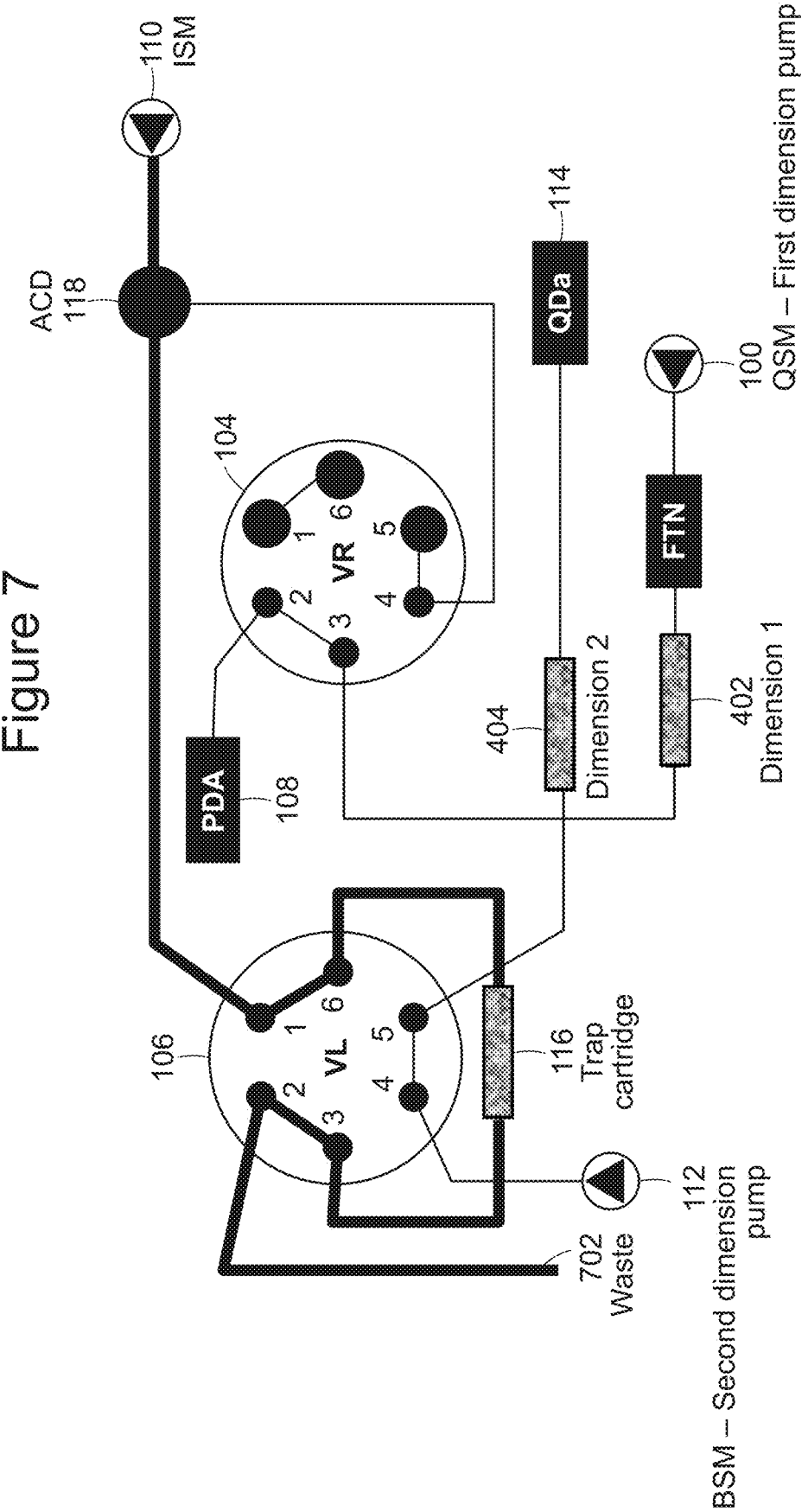
FIG. 7 shows an exemplary wash step of a trap cartridge in a multi-dimensional system with At-Column Dilution for one dimension.

FIG. 7 shows the configuration for the completion of the separation on the first dimension (Dimension 1, 402) and the wash step for the trap cartridge (116). The first valve (VR, 104) was back in Position 2. The second valve (VL, 106) was back in Position 2. At time 1.2, the first valve (VR, 104) was returned to the original position and the first fluid flow was again directed to the first detector (PDA, 108) to continue the first dimension separation (Dimension 1, 402). The first pump (QSM, 100) continues the first fluid flow through the first dimension (Dimension 1, 402) until completed. Upon positioning the first valve (VR, 104), the second pump (ISM, 110) washed the trap cartridge (116) with the second fluid flow. The third pump (BSM, 112) was still running the initial equilibration for the 2D column.

Figure 8:
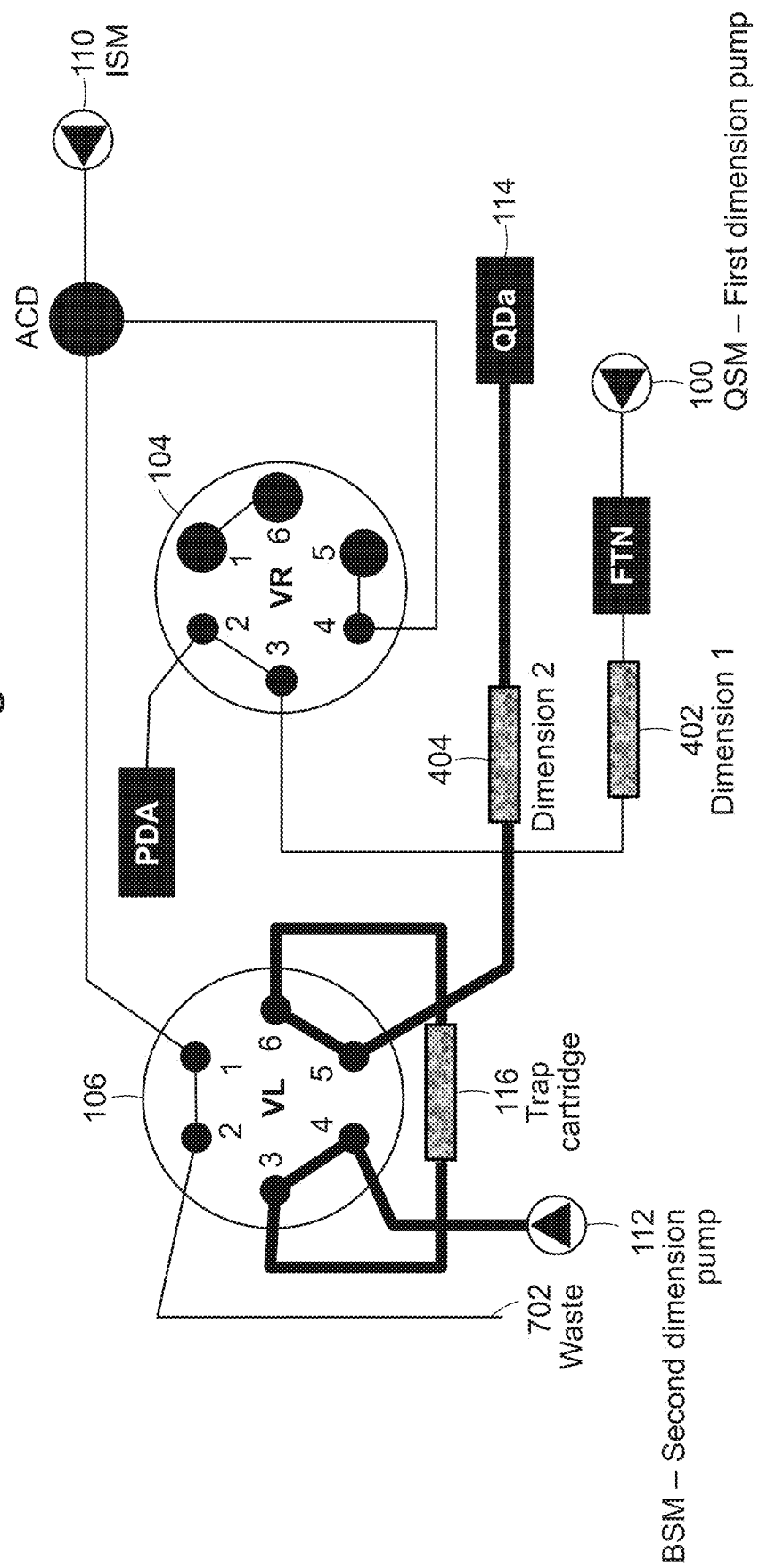
FIG. 8 shows an exemplary second dimension flow in a multi-dimensional system with At-Column Dilution for one dimension.

At time 1.5, the second valve (VL, 106) was positioned to allow the second pump (ISM, 110) to flow to waste (702), and to allow the third pump (BSM, 112) to be directed to the back end of the trap cartridge (116), second column (Dimension 2, 404) and second detector (QDa, 114). FIG. 8 shows the configuration for fourth fluid flow from the third pump (BSM, 112) the trap cartridge (116), to the second column (Dimension 2, 404) and then to the second detector (QDa, 114). The first valve (VR, 104) was back in Position 2. The second valve (VL, 106) was in Position 1 to bring the fourth fluid flow in-line with the trap cartridge (116). The fourth fluid flow back-flushes the trap cartridge (116) moving the transferred analyte(s) to the head of the second column (Dimension 2, 404) and subsequent separation. The first pump (QSM, 100) continues the first fluid flow through the first dimension (Dimension 1, 402) until completed and/or re-equilibration occurs. The second pump (ISM, 110) pumps to the second fluid flow to waste (702) or is reduced.

Figure 9:
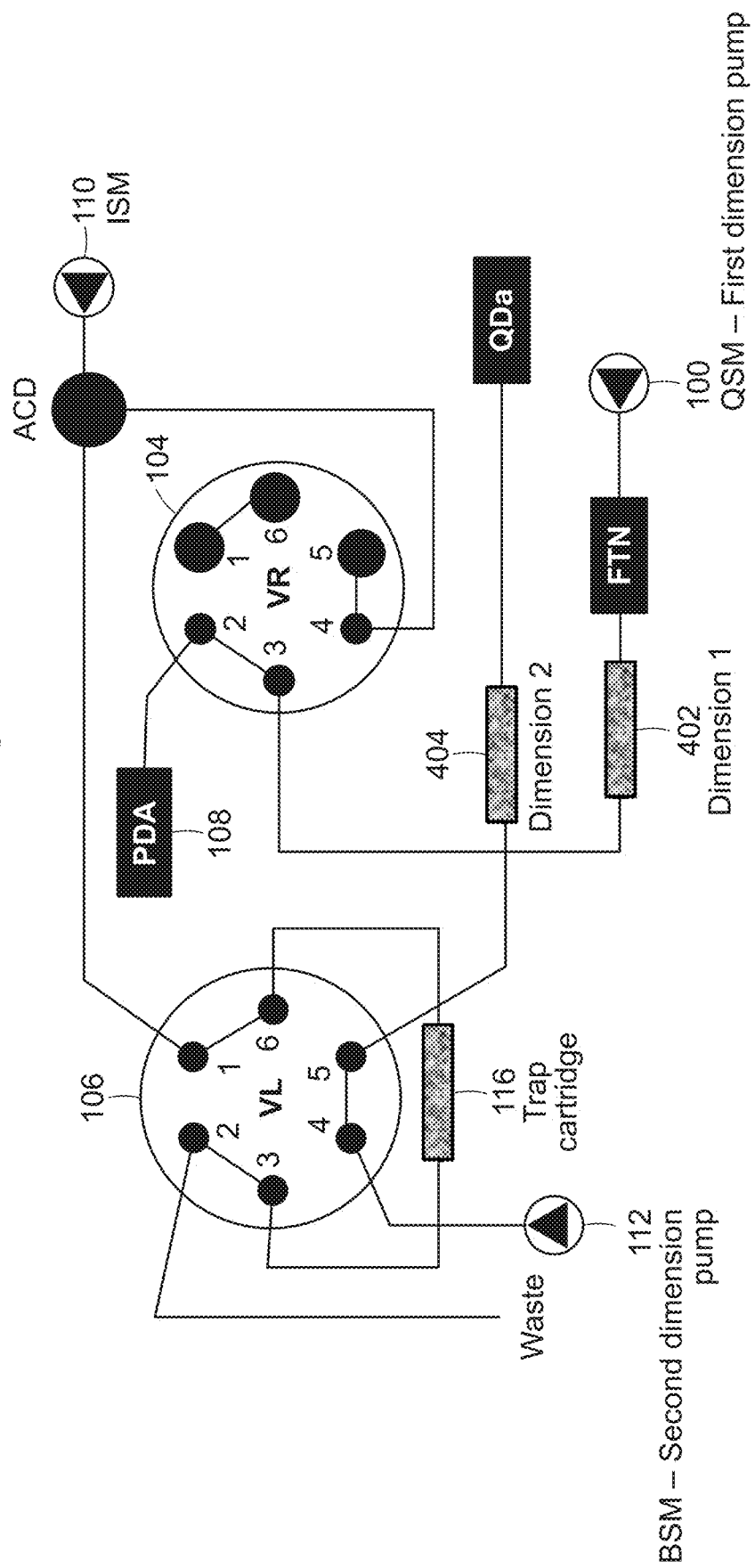
FIG. 9 shows an exemplary re-equilibration, or return to initial conditions, for a multi-dimensional system with At-Column Dilution for one dimension.

FIG. 9 shows the return to starting conditions of the multi-dimensional system with ACD for the first dimension. The first pump (QSM, 100) provides the first fluid flow to the first column (Dimension 1, 402), first valve (VR, 104) and first detector (PDA, 108). The first valve (VR, 104) was back in Position 2. The second pump (ISM, 110) provides the second fluid flow to the second valve (VL, 106) and trap cartridge (116). The second valve (VL, 106) was back in Position 2. The third pump (BSM, 112) equilibrated the second column (Dimension 2, 404).

Example 2

The multi-dimensional chromatography system with At-Column Dilution for two dimension included: a Quaternary Solvent Manager (QSM, 100)—First dimension pump; a Sample Manager (SM-FTN, 102); a Column Manager (CM-A, 202) having 2D valves with 6 ports/2 positions (VR, 104 and VL, 106); a Photo-Diode Array detector (PDA, 108)—First dimension detector; an Isocratic Solvent Manager (ISM, 110)—Dilution pump; a Binary Solvent Manager (BSM, 112)—Second dimension pump; and a mass detector (e.g., an ACQUITY QDa® QDa, commercially available from Waters Corporation, Milford, Mass., USA)—Second dimension detector (114). The system also included an ACD "T" mixer (118). The system was run using Empower™ software on ACQUITY® DP4 SR1 instrumentation both commercially available from Waters Corporation, Milford, Mass.

Figure 10:
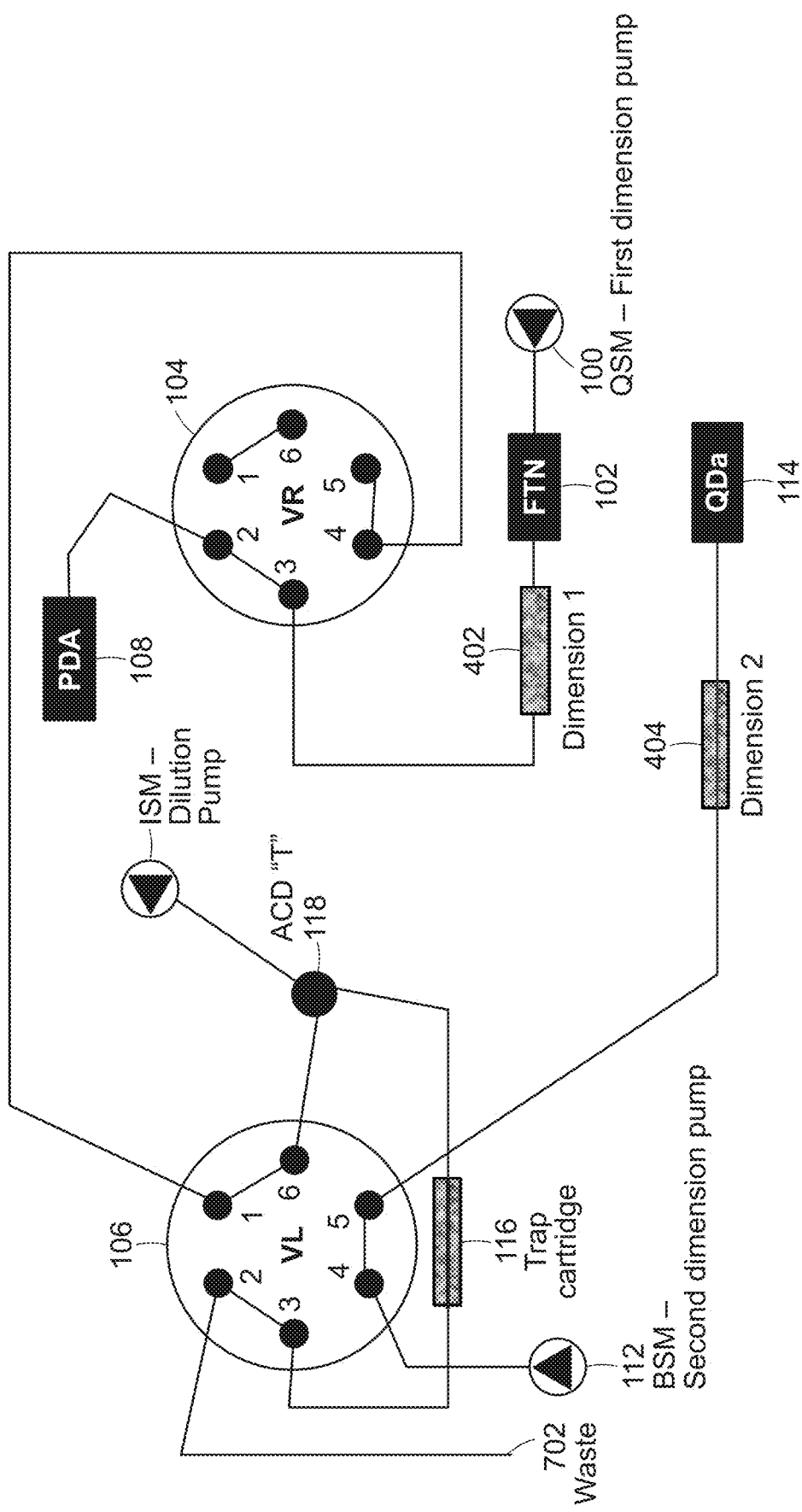
FIG. 10 shows an exemplary flow diagram of a multi-dimensional system with ACD for both dimensions.

FIG. 10 shows the flow diagram of the multi-dimensional system with At-Column Dilution for both dimensions. On the right valve (VR, 104), ports 1, 5 and 6 are closed with pin plugs. The instrument set-up, columns, mobile phases, and detectors are as follows. The first dimension (Dimension 1, 402) column was a BEH C18, 2.1×50 mm, 1.7 µm. The second dimension (Dimension 2, 404) column was a BEH C18 2.1×50 mm, 1.7 µm. The trapping column (116) was a XBridge C18 Direct Connect 2.1×30 mm. All columns obtained from Waters Corporation, Milford, Mass. The mobile phase for the first pump (QSM, 100) was Solvent A: Water, Solvent B: Acetonitrile, Solvent C: 1% Formic Acid in Water. The mobile phase for the third pump (BSM, 112) was Solvent A: 0.1% Ammonium Hydroxide in Water and Solvent B: 0.1% Ammonium Hydroxide in Acetonitrile. The mobile phase for the second pump (ISM, 110) was water. The needle wash was 80/20 ACN/water. The seal wash was 10% ACN. The injection volume: 3.0 µL and 0.5 µL. The first detector (PDA, 108) scan was from 210 to 400 nm, channel: 254 nm. The second detector (QDa, 114) scan was from 100 to 650 Da. The temperatures were (Dimension 1, 402) 40° C., (Dimension 2, 404) 40° C. and the trap column: Room Temperature. A summary of the method details and fluid flows is shown in FIG. 11.

The sample(s) tested using the multi-dimensional system with at column dilution for both dimensions are as follows. The sample was a mixture of the following standards: 2 mg/ml each of 3-benzoylpyridine, Cortisone, 4-nitroaniline, 4,4'-biphenol (in Methanol), 200 ug/mL each of acetaminophen, acetamidophenol, acetanilde, acetylsalicylic acid, caffeine, phenacetin, salicylic Acid, (in Acetonitrile) and 1.0 mg/mL each of sulfadimethoxine, terfenadine, reserpine, acetaminophen, and caffeine (in acetonitrile). The final Sample Solution was 0.45 mg/mL Sulfadimethoxine, Terfenadine, Reserpine, Acetaminophen, Caffeine, 90 ug/mL Acetamidophenol, Acetanilde, Acetylsalicylic Acid, Phenacetin, and 0.20 mg/mL Salicylic Acid, 3-benzoylpyridine, Cortisone, 4-nitroaniline, 4,4'-biphenol.

Figure 12:
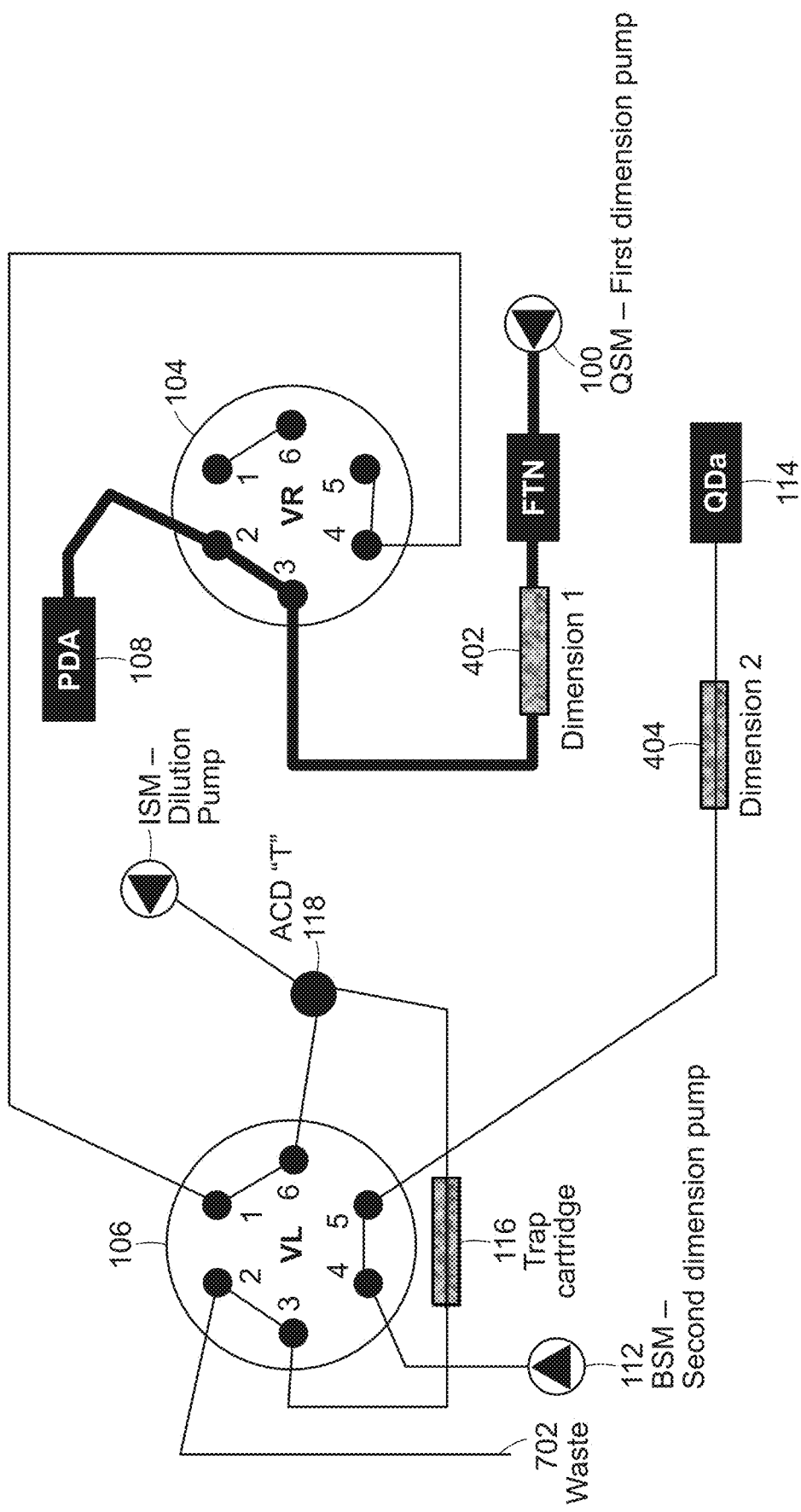
FIG. 12 shows an exemplary first dimension separation on a multi-dimensional system with At-Column Dilution for both dimensions.

An initial separation was performed in the first dimension using the first pump (QSM, 100), first dimension (Dimension 1, 402) column, first valve (VR, 104) and first detector (PDA, 108). The first valve (VR, 104) was in Position 2 and positioned to allow the first flow to be directed to the first detector (PDA, 108). The second valve (VL, 106) was in Position 2 and positioned to allow the second pump (ISM, 110) to pre-treated the trap cartridge (116). The third pump (BSM, 112) equilibrated the second dimension (Dimension 2, 404) column FIG. 12 shows the fluid flow for the first dimension separation. An initial separation was performed using a 3.0 uL injection volume to determine the retention of the peaks and identify any unresolved components.

Figure 13:
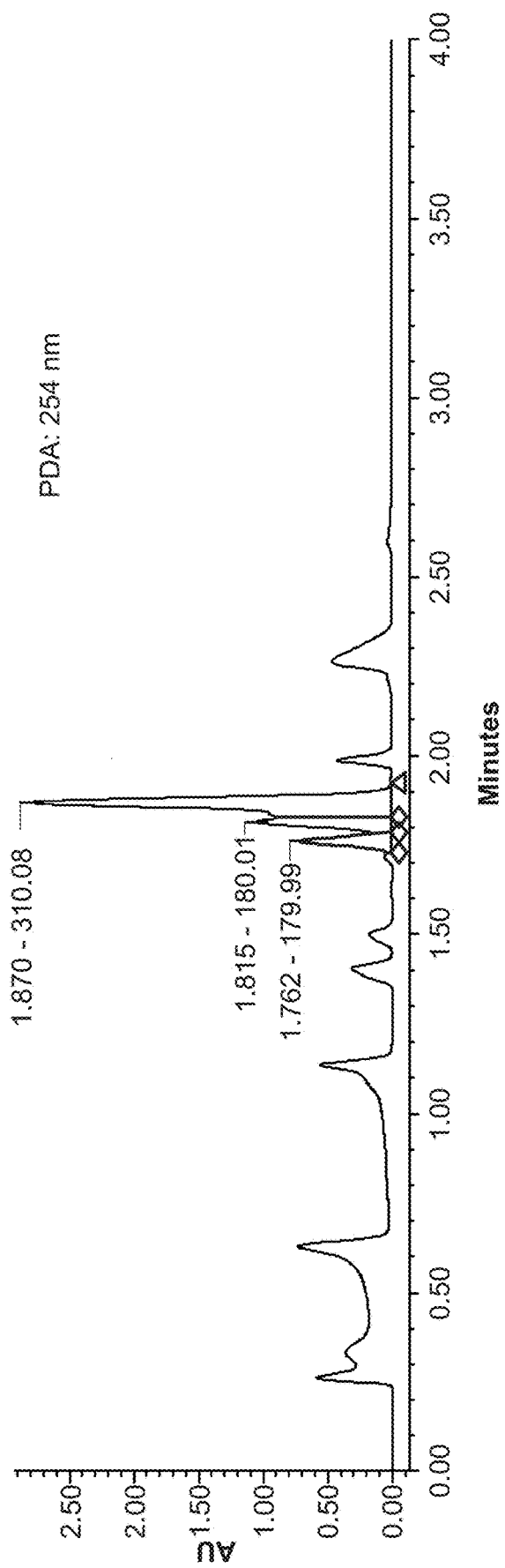
FIG. 13 shows an exemplary chromatogram of a 3.0 uL injection volume of a sample solution analyzed on a first dimension column using a UV detector at 254 nm. The chromatogram can be used to determine the correlating UV chromatogram of successive injections. A mass spectrometer can also be used in-line with the UV detector to determine the correlating mass with each peak.

FIG. 13 shows the chromatogram of the 3.0 uL injection volume of the sample solution analyzed on the first dimension (Dimension 1, 402) column using the UV detector, that is, the first detector (PDA, 108) at 254 nm. A group of unresolved components eluted between 1.6 and 1.9 minutes. The unresolved components eluting between 1.6 and 1.9 minutes were diverted by positioning the first valve (VR, 104) to allow the first flow to be directed to the second valve (VL, 106), ACD "T" (118) and trap cartridge (116).

Figure 14:
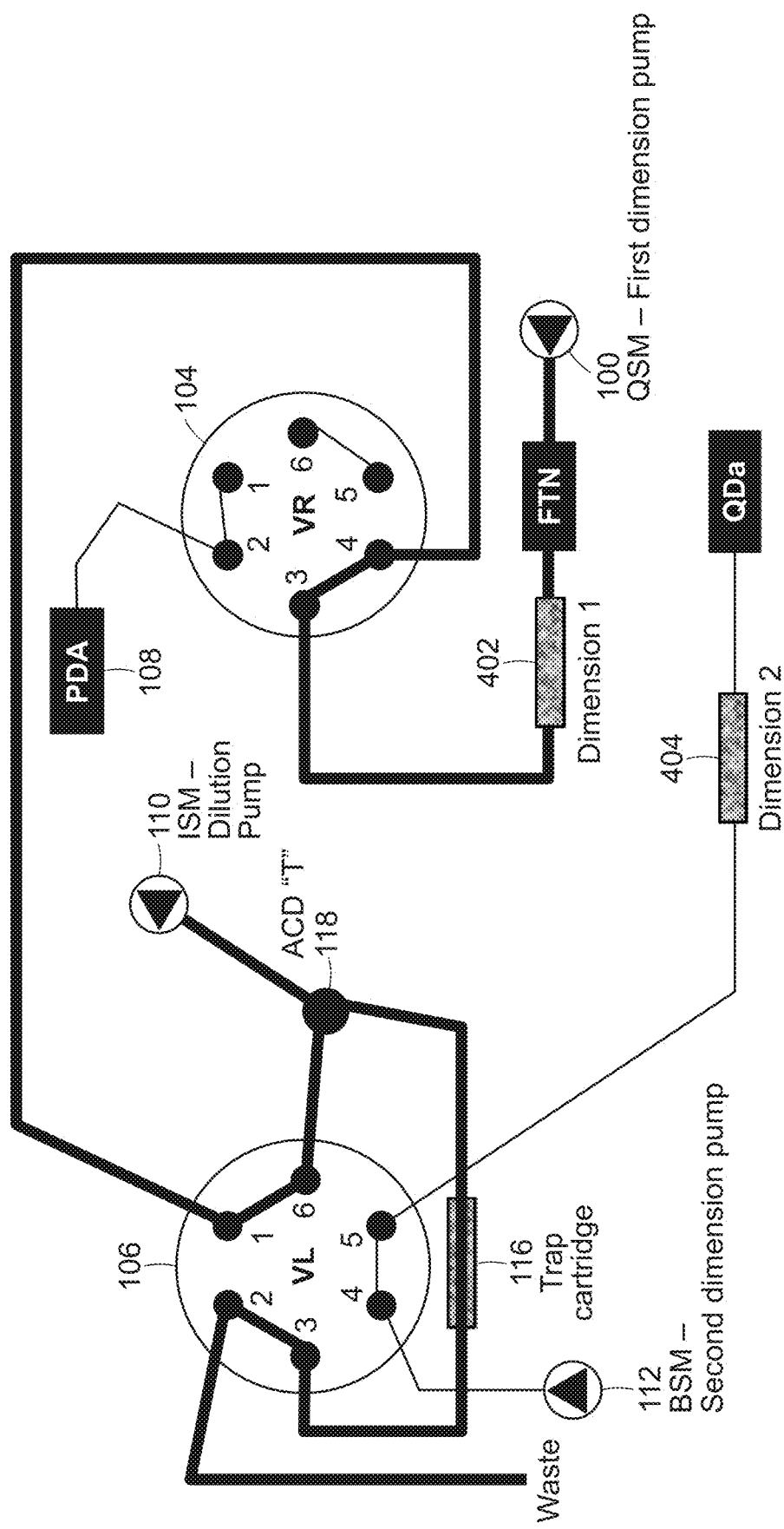
FIG. 14 shows an exemplary diversion of one or more components from a first dimension separation on a multi-dimensional system with At-Column Dilution for both dimensions.

FIG. 14 shows the diversion of the unresolved components eluting between 1.6 and 1.9 minutes. The first valve (VR, 104) was put in Position 1 to divert or cut one or more components from first dimension. The first fluid flow from the first pump (QSM, 100) was diluted by the second fluid flow from the second pump (ISM, 110) at the ACD "T" (118). The first fluid flow was diluted from an about 40% organic content to a combined flow of about 20% organic content which carried the unresolved components to the front end of the trap cartridge (116). The trap cartridge (116) retained the unresolved components in a sharp band. The third pump (BSM, 112) was still running initial equilibration for the second dimension column. The second pump (ISM, 110) diluted the first flow to retain the diverted one or more components from the first dimension onto the trap cartridge. The first detector (PDA, 108) was removed from the flow path.

Figure 15:
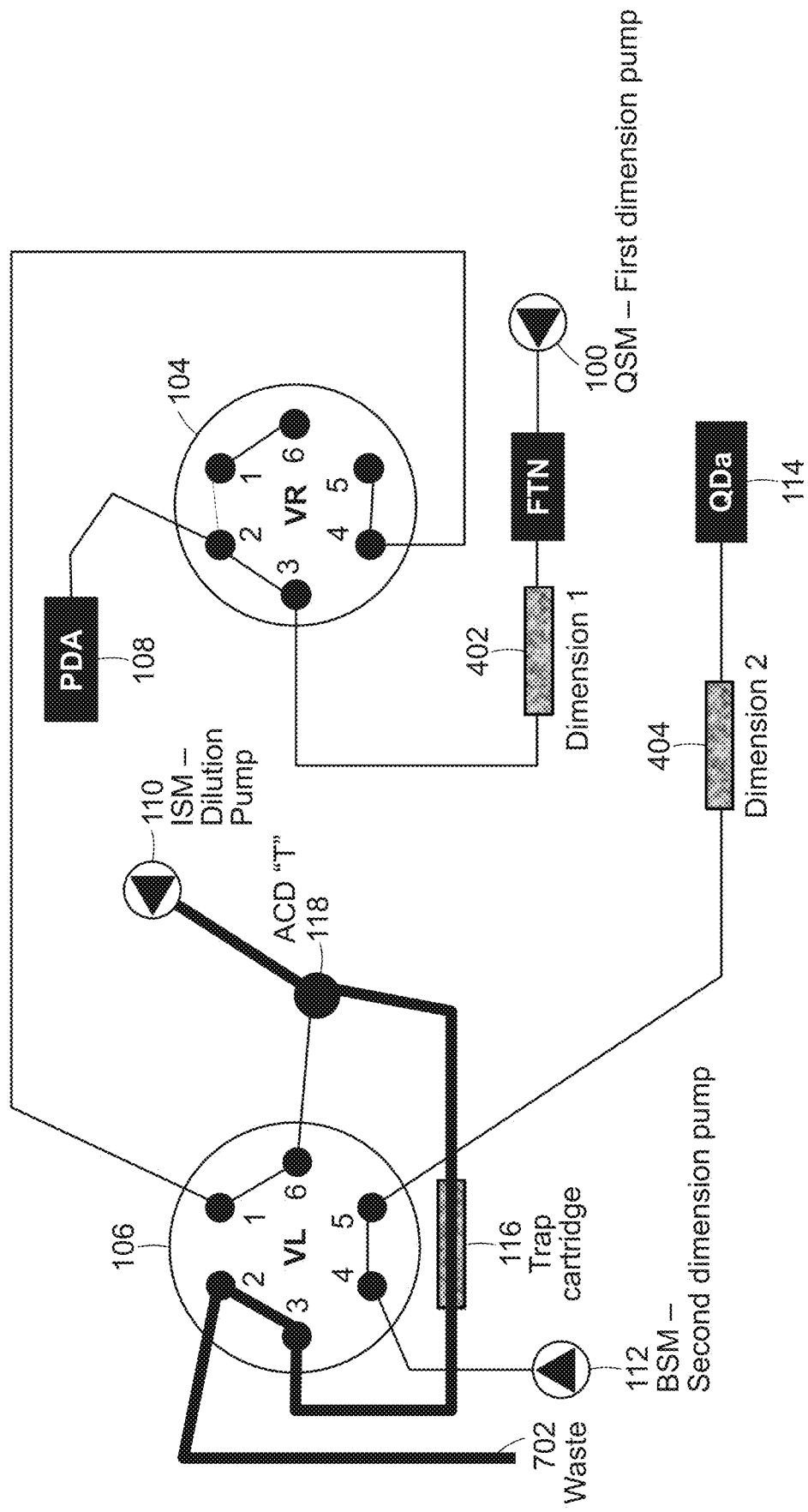
FIG. 15 shows an exemplary wash step of one or more components on a trap cartridge in a multi-dimensional system with At-Column Dilution for both dimensions.

Once the unresolved components were contained on or at the trap cartridge (116), the first valve (VR, 104) was returned to Position 2 to allow the first fluid flow to be directed to the first detector (PDA, 108) to continue the first dimension separation. Upon positioning the first valve (VR, 104), the second pump (ISM, 110) washed the trap cartridge (116) with the second fluid flow. FIG. 15 shows the configuration for the completion of the separation on the first dimension and the wash step for the trap cartridge. The third pump (BSM, 112) was still running initial equilibration for the second dimension (Dimension 2, 404) column.

Figure 16:
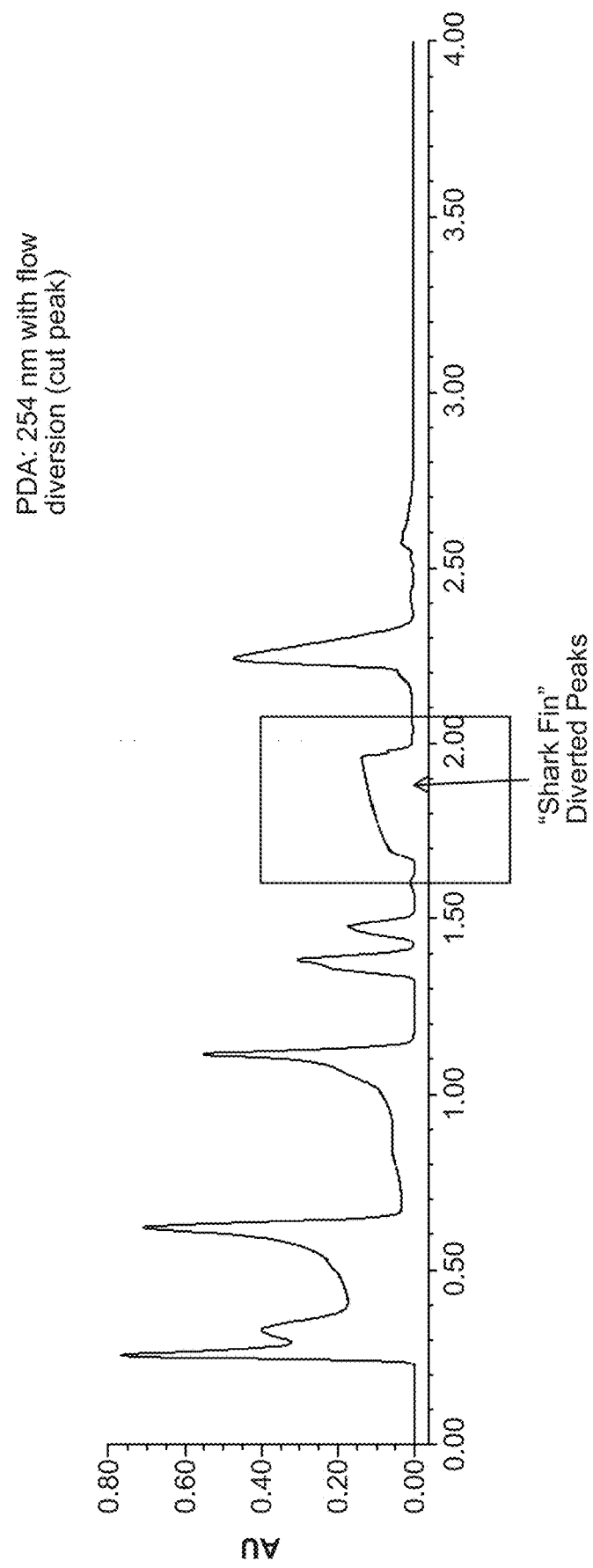
FIG. 16 shows an exemplary chromatogram of a 3.0 uL injection volume of a sample solution analyzed on a first dimension column using a UV detector at 254 nm wherein the sample was diverted from 1.6 to 1.9 minutes. In the chromatogram, the "shark fin" from 1.6 to 1.9 minutes is representative of the diverted peaks. During the diversion, no fluid was flowing through the UV detector.

FIG. 16 shows the chromatogram of the 3.0 µL injection volume of a sample solution on a first dimension (Dimension 1, 402) column using a UV detector at 254 nm wherein the sample was diverted from 1.6 to 1.9 minutes. In the chromatogram, the "shark fin" from 1.6 to 1.9 minutes is representative of the diverted peaks. During the diversion, no fluid was flowing through the UV detector, the first detector (PDA, 108).

Figure 17:
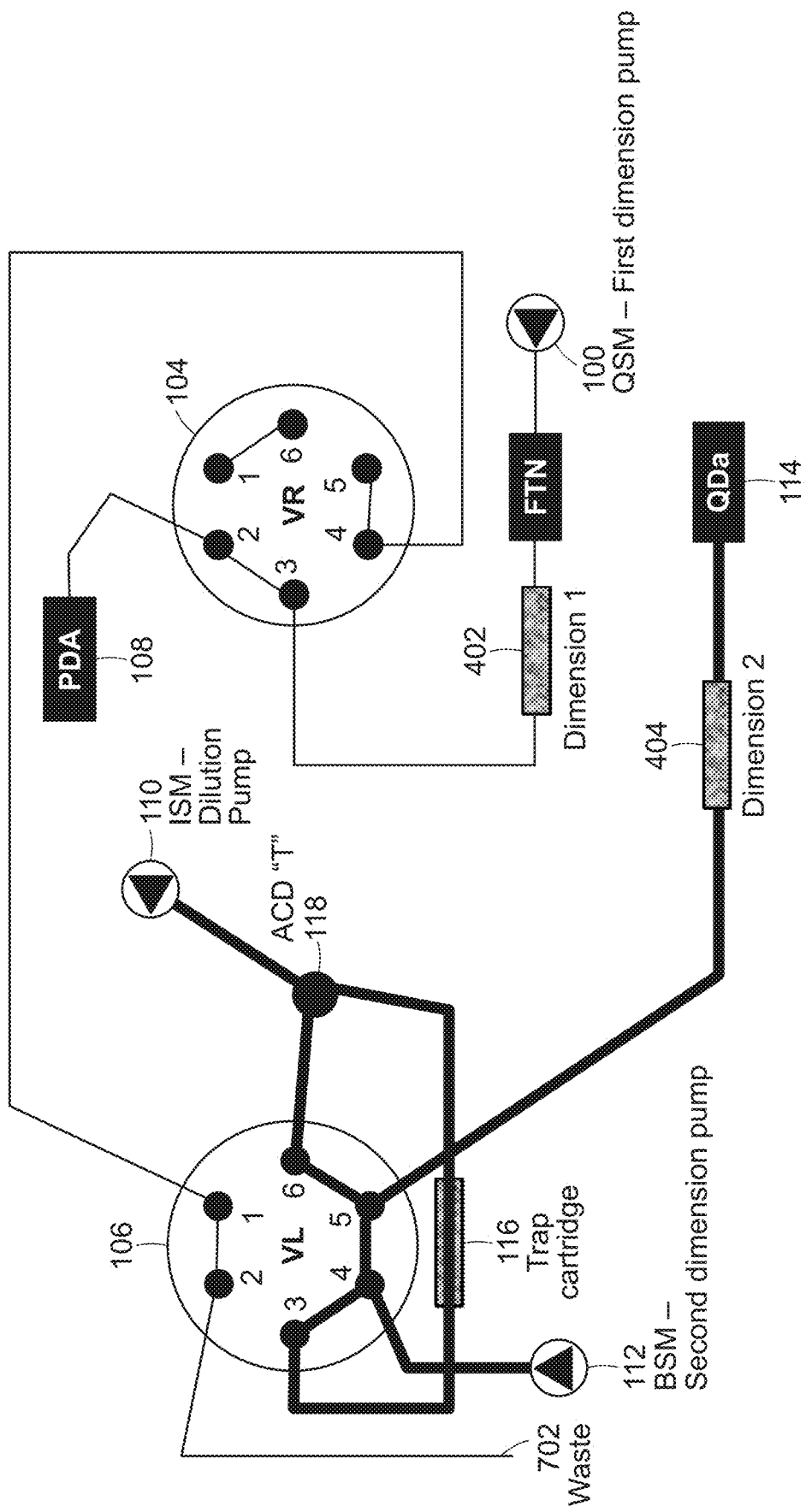
FIG. 17 shows an exemplary second dimension separation of one or more components in a multi-dimensional system with At-Column Dilution for both dimensions.
Figure 18:
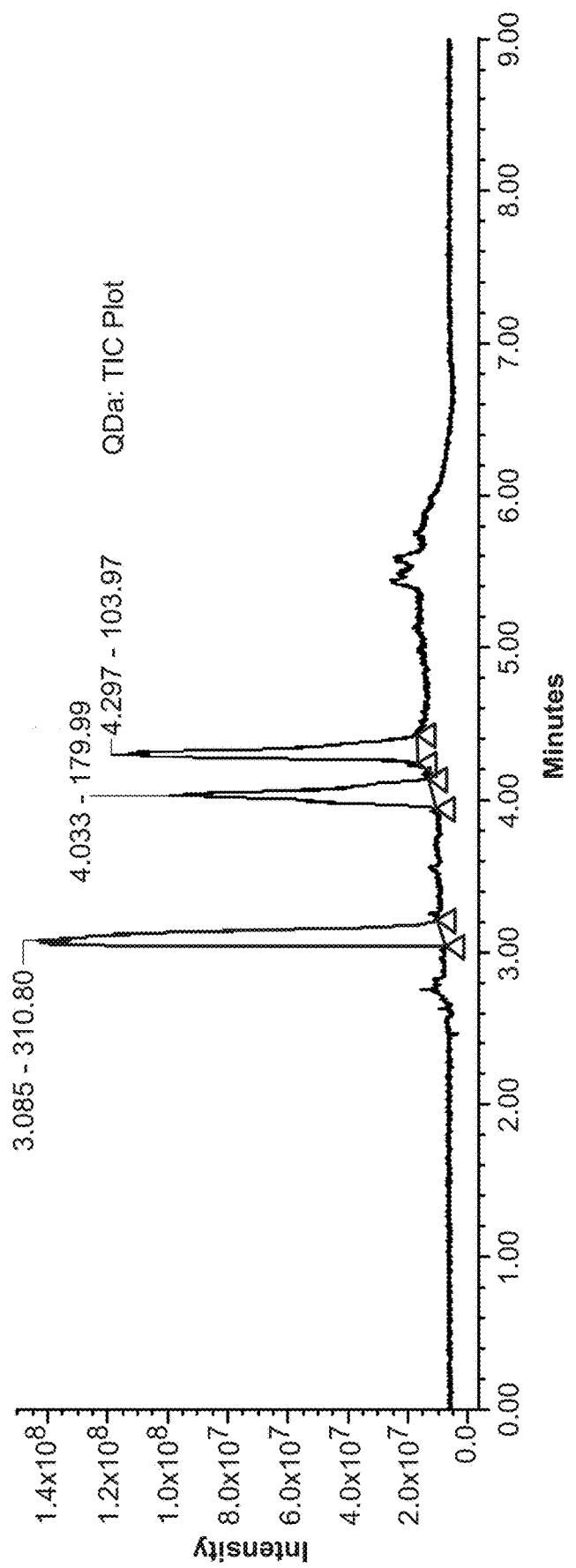
FIG. 18 shows an exemplary chromatogram of a diverted portion (1.6 to 1.9 minutes) from a first dimension (3.0 uL injection volume) analyzed on a second dimension column using a QDa mass spectrometer detector. The second dimension chromatogram shows the diverted portion separated into individual peaks for easily identification.

After washing the trap column (116), the second valve (VL, 106) was moved to Position 1 to allow a fourth fluid flow from the third pump (BSM, 112) to be directed to, or in-line with, the back end of the trap cartridge (116), ACD "T" (118), second column (Dimension 2, 404) and second detector (QDa, 114). The fourth fluid flow carries the unresolved components from the trap (116) to the second column (Dimension 2, 404) and the second detector (QDa, 114) for separation and identification. The fourth fluid flow from the third pump (BSM, 112) was diluted by the fifth fluid flow from the dilution pump (ISM, 110). The fourth flow was diluted with regard to organic content, pH value and ionic strength to a combined sixth flow which carried the unresolved components to the second column (Dimension 2, 404) and the second detector (QDa, 114). The retention of the components was improved, the resolution between the component was improved, the peak shape of the component was improved and the sensitivity of the detector was improved. FIG. 17 shows the configuration for the completion of the separation on the first column (Dimension 1, 402) and the wash step for the trap cartridge (116). FIG. 18 shows the chromatograph of the unresolved components that were resolved using the second column (Dimension 2, 404) and identified using the second detector (QDa, 114). The first pump (QSM, 100) continued the first dimension separation and was returned to initial conditions to re-equilibrate for next injection. The second pump (ISM, 110) continued to flow and dilute the sample as it is removed from the trap cartridge. The third pump (BSM, 112) was still running initial equilibration for the second dimension column. The mobile phase flows through the trap column in the reverse direction to backflush the one or more components out of the trap cartridge. A full gradient is completed in order for complete separation of the compounds within the cut peak.

Figure 19:
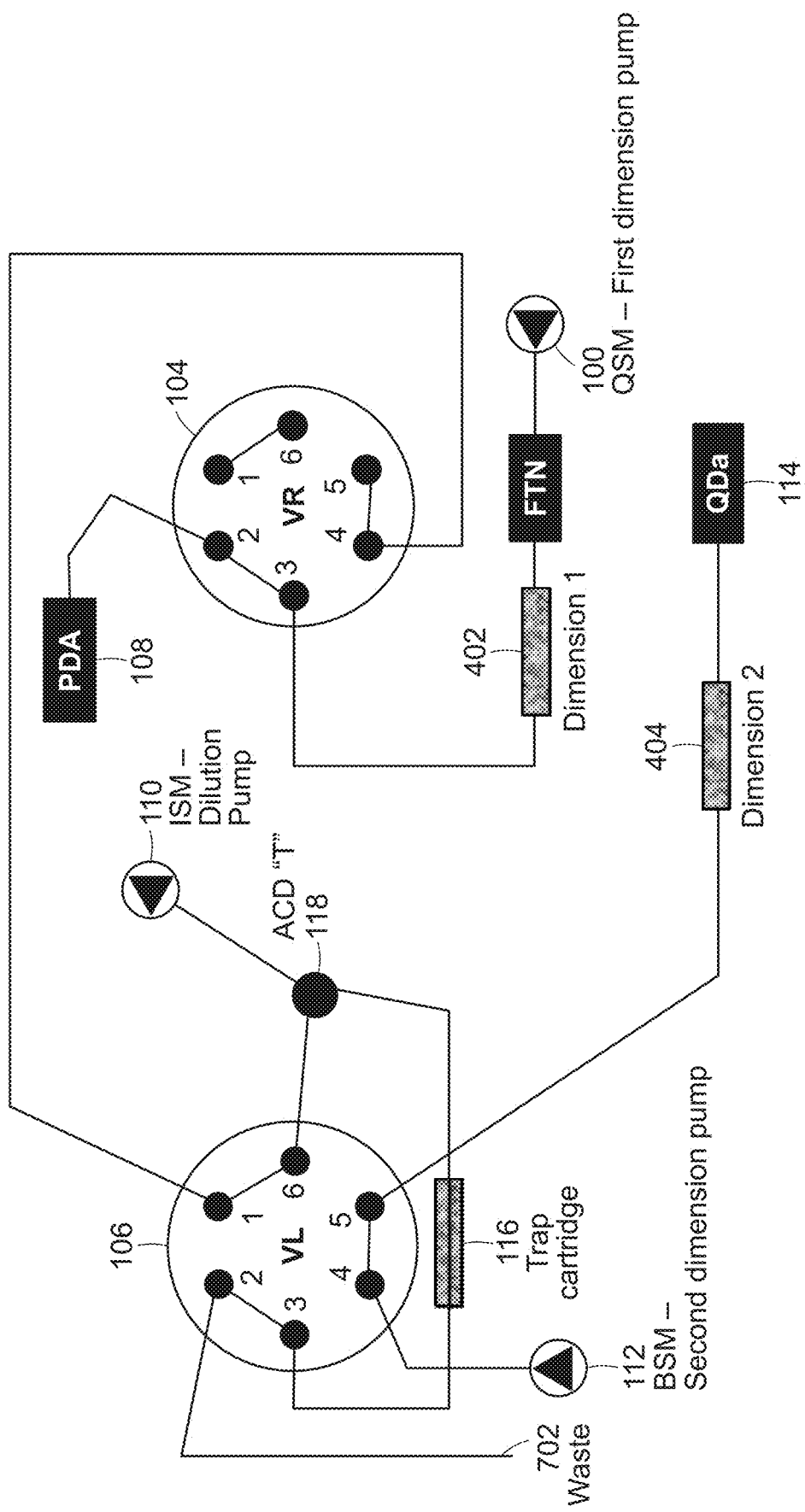
FIG. 19 shows an exemplary re-equilibration, or return to initial conditions, for a multi-dimensional system with At-Column Dilution for both dimensions.
Figure 20:
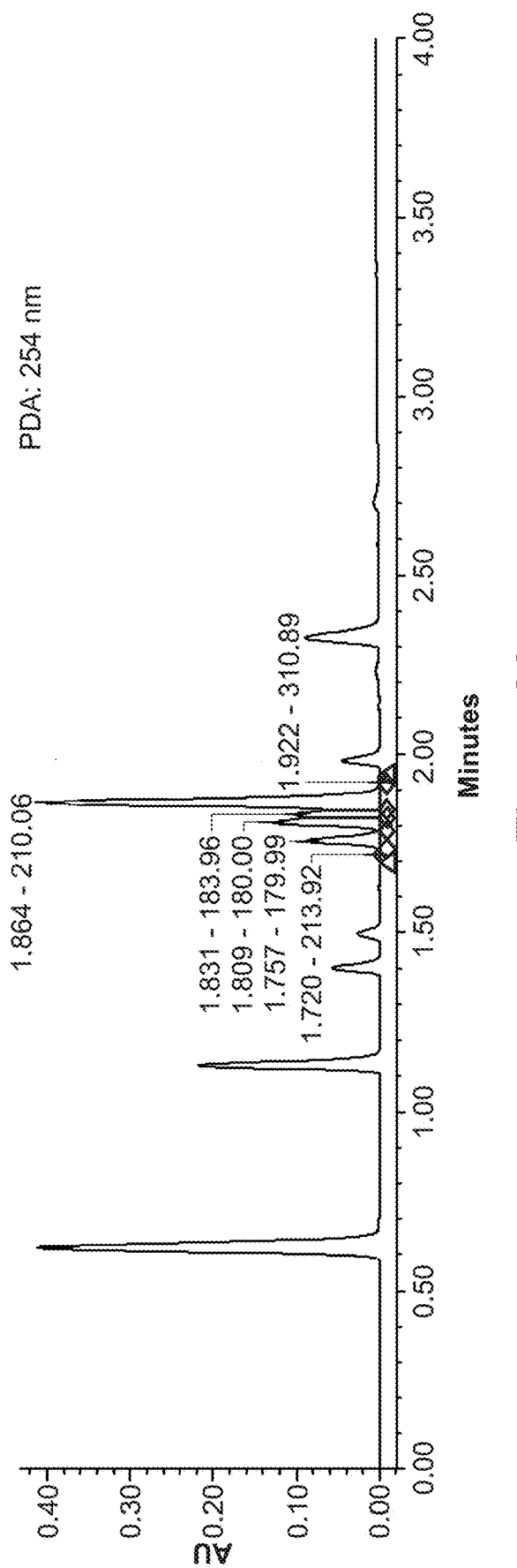
FIG. 20 shows an exemplary chromatogram of a 0.5 uL injection volume of a sample solution analyzed on a first dimension column using a UV detector at 254 nm. A smaller injection volume was performed to determine the effect of injection volume on peak shapes. The chromatogram can be used to determine the correlating UV chromatogram of successive injections. A mass spectrometer can also be used in-line with the UV detector to determine the correlating mass with each peak.
Figure 21:
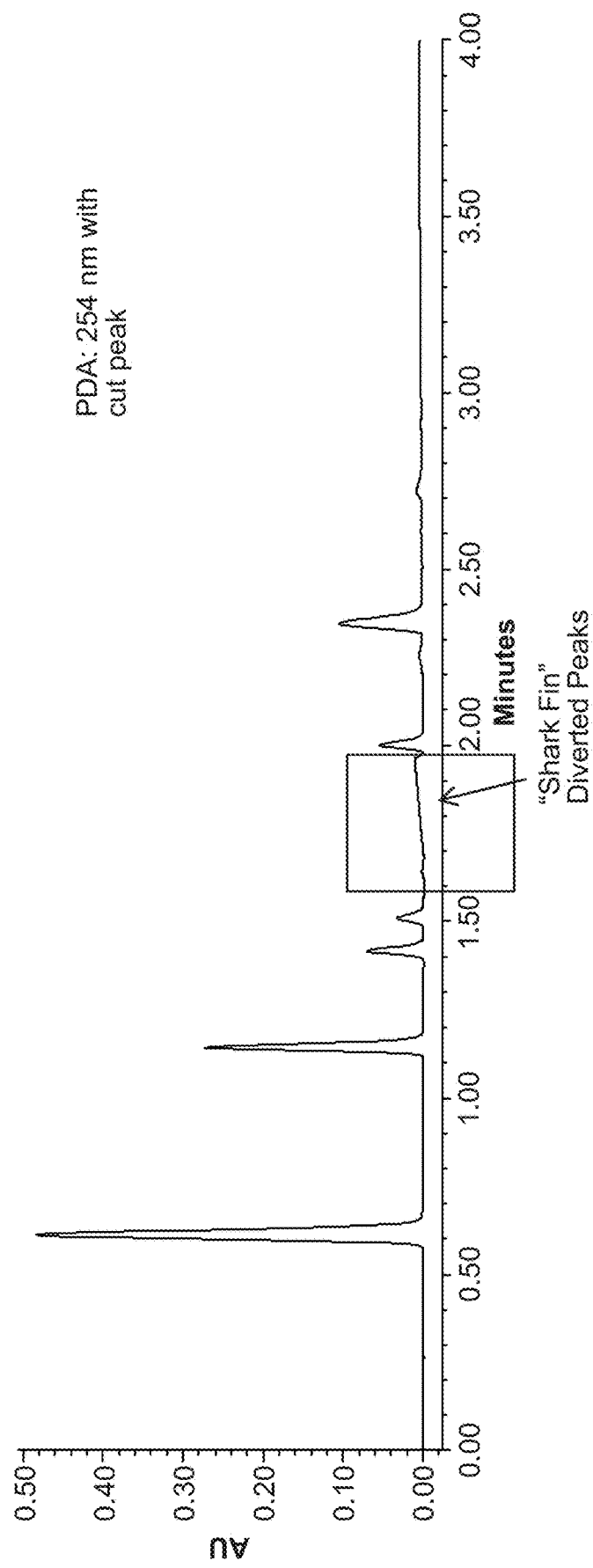
FIG. 21 shows an exemplary chromatogram of a 0.5 uL injection volume of a sample solution analyzed on a first dimension column using a UV detector at 254 nm wherein the sample was diverted from 1.6 to 1.9 minutes. In the chromatogram, a small "shark fin" from 1.6 to 1.9 minutes is representative of the diverted peaks. During the diversion, no fluid was flowing through the UV detector.
Figure 22:
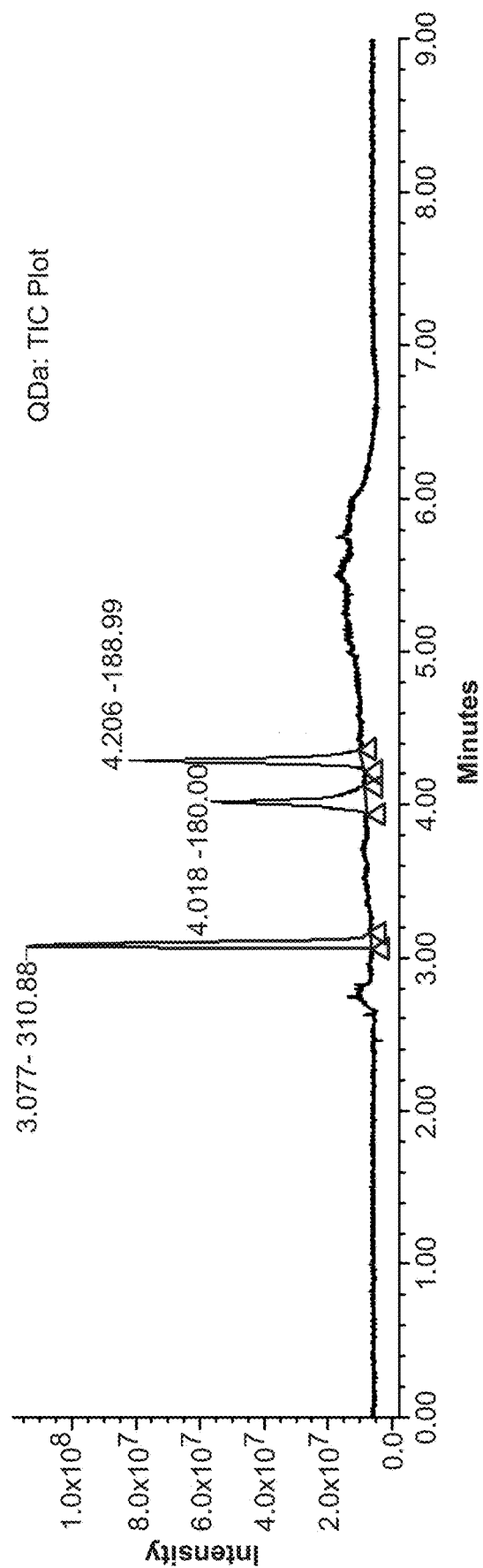
FIG. 22 shows an exemplary chromatogram of a diverted portion (1.6 to 1.9 minutes) from a first dimension (0.5 uL injection volume) analyzed on a second dimension column using a QDa mass spectrometer detector. The second dimension chromatogram shows the diverted portion separated into individual peaks for easily identification.

After both separations were performed and completed, the valves (VR, 104 and VL, 106) are positioned back to original positions (both in Position 2) to re-equilibrate the system. FIG. 19 shows the return to starting conditions of the multi-dimensional system with the ACD "T"(118) for both dimensions. The sample analysis was repeated using an injection volume of 0.5 µL. The first pump (QSM, 100), second pump (ISM, 110) and third pump (BSM, 112) were returned for the next injection at starting conditions. FIG. 20 shows the chromatogram of the 0.5 µL injection volume of the sample solution analyzed on the first dimension column using the UV detector at 254 nm. The group of unresolved components eluted between 1.6 and 1.9 minutes. FIG. 21 shows the chromatogram of the 0.5 µL injection volume of a sample solution on a first dimension column using a UV detector at 254 nm wherein the sample was diverted from 1.6 to 1.9 minutes. FIG. 22 shows the chromatograph of the unresolved components that were resolved using the second column (Dimension 2) and identified using the second detector (QDa).

Example 3

Application of Orthogonal Separation Modes in Multiple Attribute Analysis of Biopharmaceuticals Preparations of biopharmaceutical peptides and proteins can include multiple molecular forms that represent modified structure. Measurement of these species can require both information-rich detection and a tool box of separation modes. The use of a mass spectrometer can give information about the distribution of variant structures, but the spectra can become difficult to interpret as the number of combinations of variants becomes larger. Chromatographic techniques can be used to simplify the mixture entering the mass detector. All separation techniques, however, can reach a fundamental limit in the number of components that can be resolved. This limitation can be addressed using multi-dimensional chromatography, as described herein, where a particular peak or group of peaks are transferred to a second separation column. This can be challenging from both chemical and mechanical perspectives. The present disclosure describes an automated system to address these needs. A set of valves can provide multiple positions for isolating peaks or segments of a chromatogram. Each analyte can be stored in solution in the mobile phase within a loop or adsorbed to a cartridge containing chromatographic material. When the first chromatographic separation is complete or essentially complete, the components can be analyzed with the second mode of chromatography. The system incorporates an At-Column Dilution stage for adjusting the solvent strength before the second mode of chromatography. This technique can be used for adjustment of solvent strength, pH, and ionic strength. The effluent flows to a mass detector for further analysis. The present disclosure is applicable to combinations of chromatography conditions with alternative mobile phases, using both model compounds and synthetic peptides.

A synthetic peptide sequence $NH_2$-VGIGAMFLGFL-GAA-OH was tested. The first dimension (Dimension 1, 402) column was an ACQUITY UPLC® BEH C18, 2.1×50 mm, 1.7 μm. The second dimension (Dimension 2, 404) column was an ACQUITY UPLC® BEH C18, 2.1×50 mm, 1.7 μm. The trapping column (116) was a XBridge C8 Direct Connect 2.1×30 mm, 10 μm. All columns obtained from Waters Corporation, Milford, Mass. The mobile phase for the first pump (QSM, 100) was Solvent A: Water, Solvent B: Acetonitrile, Solvent C: 1% Formic Acid in Water. The mobile phase for the third pump (BSM, 112) was Solvent A: 0.1% Ammonium Hydroxide in Water and Solvent B: 0.1% Ammonium Hydroxide in Acetonitrile. The mobile phase for the second pump (ISM, 110) was water. The injection volume: 2.1 μL. The first detector (PDA, 108) scan was from 210 to 500 nm, channel: 214 nm. The second detector (QDa, 114) scan was from 100 to 1250 Da. The temperatures were (Dimension 1, 402) 30° C., (Dimension 2, 404) 30° C. and the trap column: Room Temperature. The first dimension was run using a flow rate of 0.89 mL/min and a gradient 5-85% in 2.2 minutes. The second dimension was run using a flow rate of 0.6 mL/min and a gradient 5-80% in 3 minutes.

A single stage At-Column Dilution was performed, similar to Example 1 (See, e.g., FIGS. 4-9). With the valves both in Position 2, the sample moved through the conventional chromatographic path to the PDA detector. At the elution time of the desired analyte, the first valve was switched to Position 1 to divert the analyte to the trapping cartridge. The trapping cartridge cannot efficiently retain the analyte because of the solvent type. When the first valve is switched the flow from the isocratic solvent manager is activated and combines with the column effluent at a tee and passes to the head of the trapping cartridge. When analyte elution is complete, the first valve is returned to Position 2. The isocratic solvent manager flushes the dimension 1 mobile phase from the trapping cartridge. The second valve is switched to Position 1 to elute the analyte from the trapping cartridge and pass it through the second dimension and into the QDa mass detector.

Selectable At-Column Dilution was also performed, similar to Example 2 (See, e.g., FIGS. 10, 12, 14, 15, 17 and 19). The At-Column Dilution (ACD) mixer was moved downstream of the second valve. With the valves both in Position 2, the sample moved through the conventional chromatographic path to the PDA detector. The isocratic solvent manager can be turned on/off as needed, and the flow rate adjusted to match the required dilution. At the specified retention time, the first valve was changed to Position 1 to direct the flow to the second valve. At the same time, the isocratic solvent manager began flowing to provide the required dilution. The analyte stream passed through the second valve and combined with the diluent at the At-Column Dilution tee. The diluted stream passed into the trapping cartridge and the analyte was retained.

At the end of the trapping window, the first valve was then switched back to Position 2 and the trapped analyte was rinsed. The diluent flow continued through the trap cartridge to fully displace the first mobile phase. The isocratic solvent manager was used to deliver an appropriate solvent for loading in the second dimension. Thereafter, the second valve was switched to Position 1. When the second valve was switched to the elution position, the binary solvent manager delivered the elution gradient through the trapping cartridge. As this stream eluted from the trapping cartridge, it was diluted at the ACD tee. The analyte was then separated on the second column using the solvent gradient from the binary solvent manager. The gradient can also be diluted at the tee, or the isocratic solvent manager can be turned off to allow a more rapid gradient.

Figure 23A:
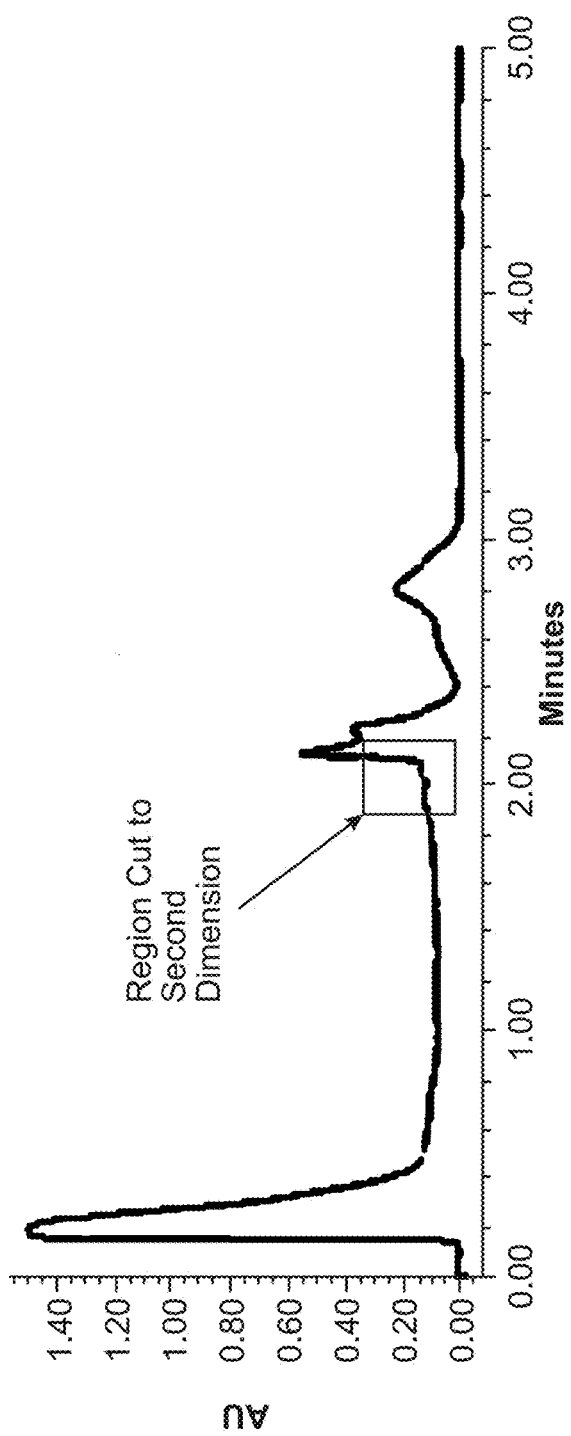
FIG. 23A shows a chromatographic separation of a synthetic peptide using one a first dimension.
Figure 23B:
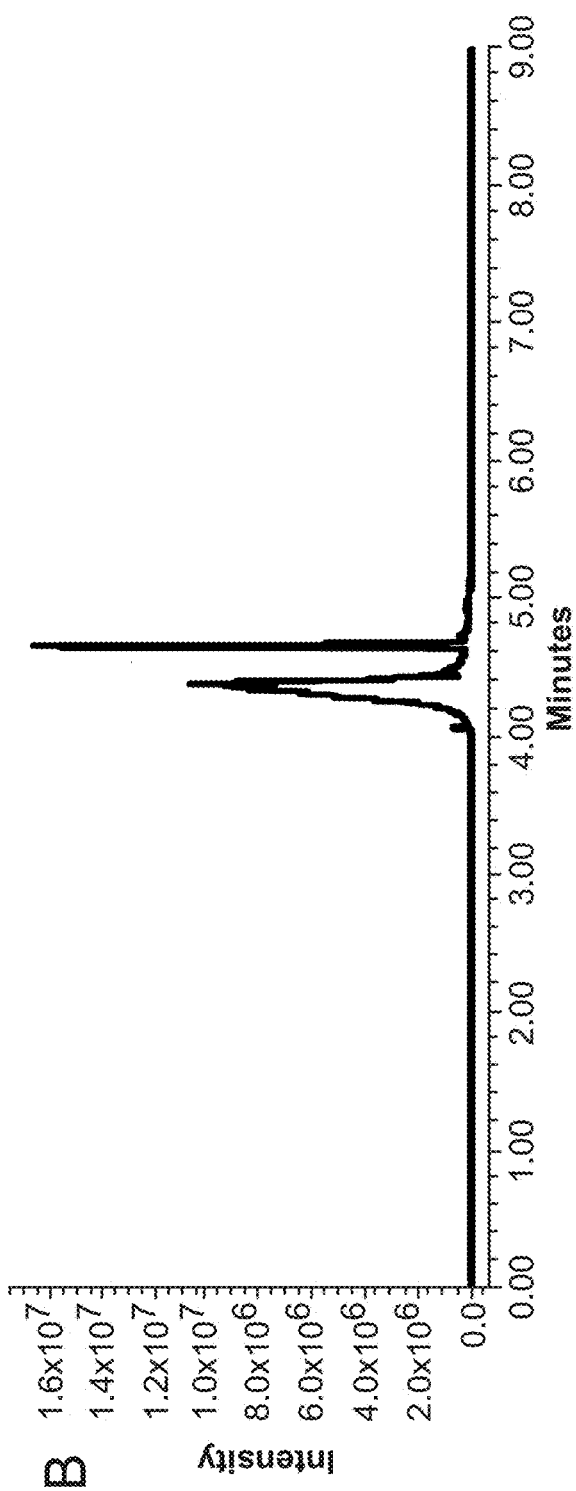
FIG. 23B shows the elution of the peptide on a second dimension.

FIGS. 23 (A and B) show the selectable At-Column Dilution for the synthetic peptide. FIG. 23A shows the dimension 1 separation of the synthetic peptide. The crude 14-residue peptide was separated using reversed-phase chromatography at pH 2. Around 2 minutes the valves and the isocratic solvent manager were actuated to trap the peptide. FIG. 23B shows the elution of the peptide on dimension 2. After flushing the mobile phase from the trapping cartridge, the valve actuated, and the binary solvent manager gradient eluted the peptide. The dimension 2 elution was at pH 10. The two dimensional separation provided orthogonal selectivity by applying a mobile phase modification to change the charge state of the analyte.

The At-Column Dilution ensured good retention for the analyte as it eluted from the multi-mode chromatography system. The system can be configured to provide At-Column Dilution for both trapping and separation stages. The At-Column Dilution can be used to adjust organic solvent concentration, pH and ionic strength. Finally, two-dimensional chromatography can be used to obtain alternate selectivity for synthetic peptide separations.

Example 4

Additional Applications

An additional application included selectable At-Column Dilution to enhance the multi-dimensional chromatography of small molecule reversed-phase alternative column separation. The instrument set-up, columns, mobile phases, and detectors are as follows. The first dimension (Dimension 1, 402) column was a BEH C18, 2.1×50 mm, 1.7 µm. The second dimension (Dimension 2, 404) column was a BEH Phenyl 2.1×50 mm, 1.7 µm. The trapping column (116) was a XBridge C18 Direct Connect 2.1×30 mm. All columns were obtained from Waters Corporation, Milford, Mass. The mobile phase for the first pump (QSM, 100) was Solvent A: Water, Solvent B: Acetonitrile, Solvent C: 1% Formic Acid in Water. The mobile phase for the third pump(BSM, 112) was Solvent A: 0.1% Formic Acid in Water and Solvent B: 0.1% Formic Acid in Acetonitrile. The mobile phase for the second pump (ISM, 110) was 0.1% Formic Acid in water. The needle wash was 80/20 ACN/water. The seal wash was 10% ACN. The injection volume: 1.0 µL. The first detector (PDA, 108) scan was from 210 to 400 nm, channel: 254 nm. The second detector (QDa, 114) scan was from 100 to 650 Da. The temperatures were (Dimension 1, 402) 40° C., (Dimension 2, 404) 40° C. and the trap column: Room Temperature.

Another application included selectable At-Column Dilution to enhance the multi-dimensional chromatography of a synthetic peptide reversed-phase alternative mobile phase separation. The instrument set-up, columns, mobile phases, and detectors are as follows. The first dimension (Dimension 1, 402) column was a BEH C18, 2.1×50 mm, 1.7 µm. The second dimension (Dimension 2, 404) column was a BEH C18, 2.1×50 mm, 1.7 µm. The trapping column (116) was a XBridge C18 Direct Connect 2.1×30 mm. All columns were obtained from Waters Corporation, Milford, Mass. The mobile phase for the first pump (QSM, 100) was Solvent A: Water, Solvent B: Acetonitrile, Solvent C: 1% Formic Acid in Water. The mobile phase for the third pump (BSM, 112) was Solvent A: 0.1% Ammonium Hydroxide in Water and Solvent B: 0.1% Ammonium Hydroxide in Acetonitrile. The mobile phase for the second pump (ISM, 110) was water. The needle wash was 80/20 ACN/water. The seal wash was 10% ACN. The injection volume: 1.0 µL. The first detector (PDA, 108) scan was from 210 to 400 nm, channel: 214 nm. The second detector (QDa, 114) scan was from 100 to 1250 Da. The temperatures were (Dimension 1, 402) 40° C., (Dimension 2, 404) 40° C. and the trap column: Room Temperature.

Another application included selectable At-Column Dilution to enhance the multi-dimensional chromatography of a synthetic peptide reversed-phase alternative column separation. The instrument set-up, columns, mobile phases, and detectors are as follows. The first dimension (Dimension 1, 402) column was a BEH C18, 2.1×50 mm, 1.7 µm. The second dimension (Dimension 2, 404) column was a CSH C18, 2.1×50 mm, 1.7 µm. The trapping column (116) was a XBridge C18 Direct Connect 2.1×30 mm. All columns were obtained from Waters Corporation, Milford, Mass. The mobile phase for the first pump (QSM, 100) was Solvent A: Water, Solvent B: Acetonitrile, Solvent C: 1% Formic Acid in Water. The mobile phase for the third pump (BSM, 112) was Solvent A: 0.1% Formic Acid in Water and Solvent B: 0.1% Formic Acid in Acetonitrile. The mobile phase for the third pump (ISM, 110) was 1% Formic Acid in water. The needle wash was 80/20 ACN/water. The seal wash was 10% ACN. The injection volume: 1.0 µL. The first detector (PDA, 108) scan was from 210 to 400 nm, channel: 214 nm. The second detector (QDa, 114) scan was from 100 to 1250 Da. The temperatures were (Dimension 1, 402) 40° C., (Dimension 2, 404) 40° C. and the trap column: Room Temperature.

Another application included selectable At-Column Dilution to enhance the multi-dimensional chromatography of an intact protein size exclusion-reversed phase with desalting for MS detection separation. The instrument set-up, columns, mobile phases, and detectors are as follows. The first dimension (Dimension 1, 402) column was an ACQUITY UPLC® Protein BEH SEC 200 Å, 4.6×150 mm, 1.7 µm. The second dimension (Dimension 2, 404) column was an ACQUITY UPLC® Protein BEH C4, 300 Å, 2.1×50 mm, 1.7 µm. The trapping column (116) was a MassPREP Micro Desalting Column 2.1×5 mm All columns were obtained from Waters Corporation, Milford, Mass. The mobile phase for the first pump (QSM, 100) was Solvent A: 20 mM Sodium Phosphate, 150 mM Sodium Chloride, pH 6.8. The mobile phase for the third pump (BSM, 112) was Solvent A: 0.1% Formic Acid in Water and Solvent B: 0.1% Formic Acid in Acetonitrile. The mobile phase for the second pump (ISM, 110) was 1% Formic Acid in water. The needle wash was 20 mM Sodium Phosphate, 150 mM Sodium Chloride, pH 6.8. The seal wash was 10% ACN. The injection volume: 1.0 µL. The TUV detector channel was 280 nm. The SQD2 scan was from 100 to 3000 Da. The temperatures were (Dimension 1, 402) Room Temperature, (Dimension 2, 404) 40° C. and the trap column: Room Temperature.

Another application included selectable At-Column Dilution to enhance the multi-dimensional chromatography of an intact protein ion exchange-reversed phase with desalting for MS detection separation. The instrument set-up, columns, mobile phases, and detectors are as follows. The first dimension (Dimension 1, 402) column was an Protein-Pak Hi Res Q, 4.6×100 mm, 5 µm. The second dimension (Dimension 2, 404) column was an ACQUITY UPLC® Protein BEH C4, 300 Å, 2.1×50 mm, 1.7 µm. The trapping column (116) was a MassPREP Micro Desalting Column 2.1×5 mm. All columns were obtained from Waters Corporation, Milford, Mass. The mobile phase for the first pump (QSM, 100) was Solvent A: 20 mM TRIS-HCl, 8.5, Solvent B: 20 mM TRIS-HCl, 250 mM Sodium Chloride, pH 8.5. The mobile phase for the third pump (BSM, 112) was Solvent A: 0.1% Formic Acid in Water and Solvent B: 0.1% Formic Acid in Acetonitrile. The mobile phase for the second pump (ISM, 110) was 1% Formic Acid in water. The needle wash was 20 mM TRIS-HCl, pH 8.5. The seal wash was 10% ACN. The injection volume: 1.0 µL. The TUV detector channel was 280 nm. The SQD2 scan was from 100 to 3000 Da. The temperatures were (Dimension 1, 402) Room Temperature, (Dimension 2, 404) 40° C. and the trap column: Room Temperature.

Another application included selectable At-Column Dilution to enhance the multi-dimensional chromatography of an intact protein ion exchange-size exclusion separation. The instrument set-up, columns, mobile phases, and detectors are as follows. The first dimension (Dimension 1, 402) column was an Protein-Pak Hi Res Q, 4.6×100 mm, 5 µm, obtained from Waters Corporation, Milford, Mass. The second dimension (Dimension 2, 404) column was an ACQUITY UPLC® Protein BEH SEC 200 Å, 4.6×150 mm, 1.7 µm, obtained from Waters Corporation, Milford, Mass. The trapping column (116) was an empty 50 µL loop. The mobile phase for the first pump (QSM, 100) was Solvent A: 20 mM TRIS-HCl, 8.5, Solvent B: 20 mM TRIS-HCl, 250 mM Sodium Chloride, pH 8.5. The mobile phase for the third pump (BSM, 112) was Solvent A: 20 mM Sodium Phosphate, 150 mM Sodium Chloride, pH 6.8. The mobile phase for the second pump (ISM, 110) was 20 mM Sodium Phosphate, 150 mM Sodium Chloride, pH 6.8. The needle wash was 20 mM TRIS-HCl, pH 8.5. The seal wash was 10% ACN. The injection volume: 1.0 µL. The TUV1 detector channel was 280 nm. The TUV2 detector channel was 280 nm. All column temperatures were Room Temperature.

Another application included selectable At-Column Dilution to enhance the multi-dimensional chromatography of an intact protein size exclusion-ion exchange separation. The instrument set-up, columns, mobile phases, and detectors are as follows. The first dimension (Dimension 1, 402) column was an ACQUITY UPLC® Protein BEH SEC 200 Å, 4.6×150 mm, 1.7 µm, obtained from Waters Corporation, Milford, Mass. The second dimension (Dimension 2, 404) column was a Protein-Pak Hi Res Q, 4.6×100 mm, 5 µm, also obtained from Waters Corporation, Milford, Mass. The trapping column (116) was an empty 50 µL loop. The mobile phase for the first pump (QSM, 100) was Solvent A: 20 mM Sodium Phosphate, 150 mM Sodium Chloride, pH 6.8. The mobile phase for the third pump (BSM, 112) was Solvent A: 20 mM TRIS-HCl, pH, 8.5, Solvent B: 20 mM TRIS-HCl, 250 mM Sodium Chloride, pH 8.5. The mobile phase for the second pump (ISM, 110) was 20 mM TRIS-HCl, pH 8.5. The needle wash was 20 mM Sodium Phosphate, 150 mM Sodium Chloride, pH 6.8. The seal wash was 10% ACN. The injection volume: 1.0 µL. The TUV1 detector channel was 280 nm. The TUV2 detector channel was 280 nm. All column temperatures were Room Temperature.

What is claimed is:

1. A chromatography system comprising:
   (i) a first fluid pump for pumping a first flow stream;
   (ii) a first chromatography column downstream of the first pump;
   (iii) a first valve downstream of the first chromatography column;
   (iv) a first detector and a mixer, both downstream of the first valve, wherein the first valve is configured to divert the first flow stream to the first detector or to the mixer;
   (v) a second fluid pump for pumping a second flow stream in fluid communication with the mixer, wherein the first and second flow streams have at least one physical or chemical difference and combine in the mixer to form a third flow stream, wherein the first and second pumps can vary the ratio of first to second flow streams forming the third flow stream from 0:1 to 1:0;
   (vi) a second valve downstream of the mixer; wherein the second valve is configured to divert the third flow stream to a trap or to waste, the trap having a front end and a back end and the third flow stream is in fluid communication with the front end of the trap, and wherein the trap is configured to physically or chemically retain an analyte in the third flow stream;
   (vii) a third fluid pump for pumping a fourth flow stream and in fluid communication with the second valve; wherein the second valve is configured to divert the fourth flow stream to a second chromatography column or to the back end of the trap and then through the second chromatography column; and
   (viii) one or more detectors downstream of the second chromatography column.

2. The chromatography system of claim 1, wherein the chromatography comprises normal phase, reversed phase, carbon dioxide based chromatography, ion exchange, size exclusion, hydrophilic interaction liquid interaction chromatography, hydrophobic interaction chromatography or affinity chromatography.

3. The chromatography system of claim 1, wherein the first flow stream is a strong mobile phase and the second flow stream is a weak mobile phase.

4. The chromatography system of claim 1, wherein the third flow stream has 50% or less by volume of organic composition than the first flow stream.

5. The chromatography system of claim 1, wherein the third flow stream has a pH value at least 1 pH unit different than the first flow stream.

6. The chromatography system of claim 1, wherein the third flow stream has 50% or less ionic strength than the first flow stream.

7. A chromatography system comprising:
   (i) a first fluid pump for pumping a first flow stream;
   (ii) a first chromatography column downstream of the first pump;
   (iii) a first valve downstream of the first chromatography column;
   (iv) a first detector, a second valve and a mixer, each downstream of the first valve, wherein the first valve is configured to divert the first flow stream to the first detector or to the second valve; wherein the second valve is configured to divert the first flow stream to the mixer or to waste;
   (v) a second fluid pump for pumping a second flow stream in fluid communication with the mixer, wherein the first and second flow streams have at least one physical or chemical difference and combine in the mixer to form a third flow stream, wherein the first and second pumps can vary the ratio of first to second flow streams forming the third flow stream from 0:1 to 1:0;
   (vi) a trap downstream of the mixer, the trap having a front end and a back end, wherein the third flow stream is in fluid communication with the front end of the trap and wherein the trap is configured to physically or chemically retain an analyte in the third flow stream;
   (vii) a third fluid pump for pumping a fourth flow stream and in fluid communication with the second valve; wherein the second valve is configured to divert the fourth flow stream to
      (a) a second chromatography column, or
      (b) the back end of the trap or loop, then to the mixer wherein the fourth and a fifth flow stream having at least one physical or chemical difference combine to form a sixth flow stream, wherein the second and third pumps can vary the ratio of fourth to fifth flow streams forming the sixth flow stream from 0:1 to 1:0, and through the second chromatography column; and
   (viii) one or more detectors downstream of the second chromatography column.

8. The chromatography system of claim 7, wherein the chromatography comprises normal phase, reversed phase, carbon dioxide based chromatography, ion exchange, size exclusion, hydrophilic interaction liquid interaction chromatography, hydrophobic interaction chromatography or affinity chromatography.

9. The chromatography system of claim 7, wherein the fourth flow stream is a strong mobile phase and the fifth flow stream is a weak mobile phase.

10. The chromatography system of claim 7, wherein the sixth flow stream has 50% or less by volume of organic composition than the fourth flow stream.

11. The chromatography system of claim 7, wherein the sixth flow stream has a pH value at least 1 pH unit different than the fourth flow stream.

12. The chromatography system of claim 7, wherein the sixth flow stream has 50% or less ionic strength than the fourth flow stream.

* * * * *